United States Patent
Wei et al.

(10) Patent No.: US 8,643,644 B2
(45) Date of Patent: Feb. 4, 2014

(54) MULTI-STAGE TESSELLATION FOR GRAPHICS RENDERING

(75) Inventors: Jian Wei, San Diego, CA (US); Guofang Jiao, San Diego, CA (US); Ning Bi, San Diego, CA (US); Chehui Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1372 days.

(21) Appl. No.: 12/052,628

(22) Filed: Mar. 20, 2008

(65) Prior Publication Data
US 2009/0237401 A1    Sep. 24, 2009

(51) Int. Cl.
*G06T 15/30*    (2011.01)
*G06T 17/20*    (2006.01)

(52) U.S. Cl.
USPC ............ 345/423; 345/419; 345/420; 345/442

(58) Field of Classification Search
None
See application file for complete search history.

(56) References Cited

U.S. PATENT DOCUMENTS

| | | | |
|---|---|---|---|
| 4,924,415 A | 5/1990 | Winser | |
| 5,261,029 A * | 11/1993 | Abi-Ezzi et al. | 345/423 |
| 5,473,742 A | 12/1995 | Polyakov et al. | |
| 6,204,860 B1 * | 3/2001 | Singh | 345/420 |
| 6,304,677 B1 | 10/2001 | Schuster | |
| 6,906,716 B2 | 6/2005 | Moreton et al. | |
| 7,042,452 B1 * | 5/2006 | Wasserman et al. | 345/423 |
| 7,227,546 B2 | 6/2007 | Fenney et al. | |
| 7,318,238 B2 | 1/2008 | Elvanoglu et al. | |
| 7,385,612 B1 * | 6/2008 | Peterson | 345/619 |
| 2002/0105515 A1 | 8/2002 | Mochizuki | |
| 2004/0184013 A1 * | 9/2004 | Raskar et al. | 353/121 |
| 2005/0243094 A1 * | 11/2005 | Patel et al. | 345/506 |
| 2006/0250410 A1 | 11/2006 | Qi et al. | |
| 2007/0097123 A1 * | 5/2007 | Loop et al. | 345/442 |
| 2007/0291040 A1 * | 12/2007 | Bakalash et al. | 345/505 |
| 2008/0273034 A1 | 11/2008 | Fenney et al. | |

FOREIGN PATENT DOCUMENTS

| | | |
|---|---|---|
| EP | 0847028 A2 | 6/1998 |
| JP | 11015986 A | 1/1999 |
| JP | 11066328 A | 3/1999 |
| JP | 2002260008 A | 9/2002 |
| JP | 2005525645 A | 8/2005 |
| WO | WO03096277 A2 | 11/2003 |

OTHER PUBLICATIONS

Padron, E., Amor, M., Boo, M., Doallo, R., Efficient Parallel Implementations for Surface Subdivision, Sep. 2002, 4th EGPGV, pp. 113-121.*
Rice, Daniel, "OpenVG Specification Version 1.0.1", Jan. 26, 2007, Khronos Group.
International Search Report and Written Opinion—PCT/US2009/037730, International Search Authority—European Patent Office, Aug. 20, 2009.

* cited by examiner

*Primary Examiner* — Said Broome
(74) *Attorney, Agent, or Firm* — James R. Gambale, Jr.

(57) ABSTRACT

This disclosure describes a multi-stage tessellation technique for tessellating a curve during graphics rendering. In particular, a first tessellation stage tessellates the curve into a first set of line segments that each represents a portion of the curve. A second tessellation stage further tessellates the portion of the curve represented by each of the line segments of the first set into additional line segments that more finely represent the shape of the curve. In this manner, each portion of the curve that was represented by only one line segment after the first tessellation stage is represented by more than one line segment after the second tessellation stage. In some instances, more than two tessellation stages may be performed to tessellate the curve.

40 Claims, 11 Drawing Sheets

MULTI-STAGE TESSELLATION FOR GRAPHICS RENDERING

TECHNICAL FIELD

This disclosure relates to computing devices and, in particular, to graphics rendering by computing devices.

BACKGROUND

Computing devices are increasingly requiring advanced two-dimensional (2D) and three-dimensional (3D) graphics applications. For example, computing devices are increasingly offering games, character animations, graphical menu systems and other applications that require advanced graphics rendering. This advanced graphics rendering, especially with 3D graphics, involves a substantial amount of data processing. The quality of the advanced graphics rendering may be limited by the amount of processing resources, the capability of the available processing resources, the amount of available power and the like.

For example, applications requiring advanced graphics rendering at a high rendering rate, e.g., measured as frames per second, may place a significant strain on the available computing resources. The strain on the available computing resources may result in a reduced performance in other applications, low quality graphics rendering, or both due to the heavy load placed on the computing resources. In the context of mobile computing devices, such as personal digital assistants (PDAs), wireless communication devices, global positioning devices and the like, the computationally intensive data processing required for graphics rendering may consume a significant amount of the available power of the mobile computing device.

A multi-media processor may include a general-purpose central processing unit (CPU) coupled to a graphics processing unit (GPU). The GPU is dedicated to perform graphics rendering operations to display computerized graphics on a display. GPUs are built with a highly-parallel structure that provides more efficient processing than conventional, general-purpose CPUs for a range of complex graphic-related algorithms. When the graphic-related algorithms executing on the CPU requires graphics processing, the CPU tessellates the graphics and provides the tessellations to the GPU for rendering to the display. The highly parallel nature of the GPU allows the GPU to create complex, three-dimensional images on the display more quickly than drawing the images directly to the display with the CPU. GPUs may be used in a wide variety of applications, and are very common in graphic-intensive applications, such as video games applications, complex graphical user interface applications, computer-aided design programs for engineering or artistic applications, or any other type of software application that uses 2D or 3D graphics.

SUMMARY

This disclosure describes a multi-stage tessellation technique for tessellating a curve during graphics rendering. The curve is tessellated in at least two tessellation stages. A first tessellation stage tessellates the curve into a first set of line segments that each represents a portion of the curve. A second tessellation stage further tessellates the portion of the curve represented by each of the line segments of the first set into additional line segments that more finely represent the shape of the curve. In this manner, each portion of the curve that was represented by only one line segment after the first tessellation stage is represented by more than one line segment after the second tessellation stage. In one example, the first tessellation stage may, for example, be performed by a central processing unit (CPU) and the second tessellation stage may be performed by a tessellation component, such as a graphics processing unit (GPU) or dedicated tessellation hardware. In some instances, the multi-stage tessellation technique may involve more than two tessellation stages.

In one aspect, a method comprises tessellating a curve to divide the curve into first line segments with a first computing unit and tessellating a portion of the curve represented by one of the first line segments into second line segments with a second computing unit.

In another aspect, a device comprises a first computing unit that tessellates a curve to divide the curve into first line segments and a second computing unit that tessellates a portion of the curve represented by one of the first line segments into second line segments.

In another aspect, a device comprises first means for tessellating a curve to divide the curve into first line segments and second means for tessellating a portion of the curve represented by one of the first line segments into second line segments.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor. Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more aspects are set forth in the accompanying drawings and the description below. Other features, objects, and advantages of the techniques will be apparent from the description and drawings, and from the claims.

DETAILED DESCRIPTION

This disclosure describes techniques for tessellating a curve during graphics rendering. In particular, this disclosure describes a multi-stage tessellation technique that tessellates the curve into a plurality of line segments during two or more tessellation stages. A first tessellation stage tessellates the curve into a first set of line segments that each represents a portion of the curve. The first tessellation stage may, in some cases, tessellate the curve into enough line segments to coarsely represent a shape of the curve. In one example, the first tessellation stage may be performed by a first computing unit of a computing device, such as a central processing unit (CPU) or a graphics processing unit (GPU) of the computing device.

A second tessellation stage further tessellates the curve into additional line segments. In particular, the second tessellation stage tessellates the portion of the curve represented by each of the line segments of the first set into additional line segments that more finely represent the shape of the curve. In other words, each portion of the curve that was represented by only one line segment after the first tessellation stage is represented by more than one line segment after the second tessellation stage. The second tessellation stage may be performed by a second computing unit of the computing device. In some aspects, the second computing unit may be the GPU that is dedicated to performing graphics operations, including the second tessellation stage. The GPU may, in some instances, have a highly parallel structure that may be used to tessellate multiple portions of the curve in parallel. In another aspect, the second computing unit may be dedicated tessellation hardware circuitry that performs the second tessellation stage. As will be described below the multi-stage tessellation may include more than two tessellation stages.

Figure 1:
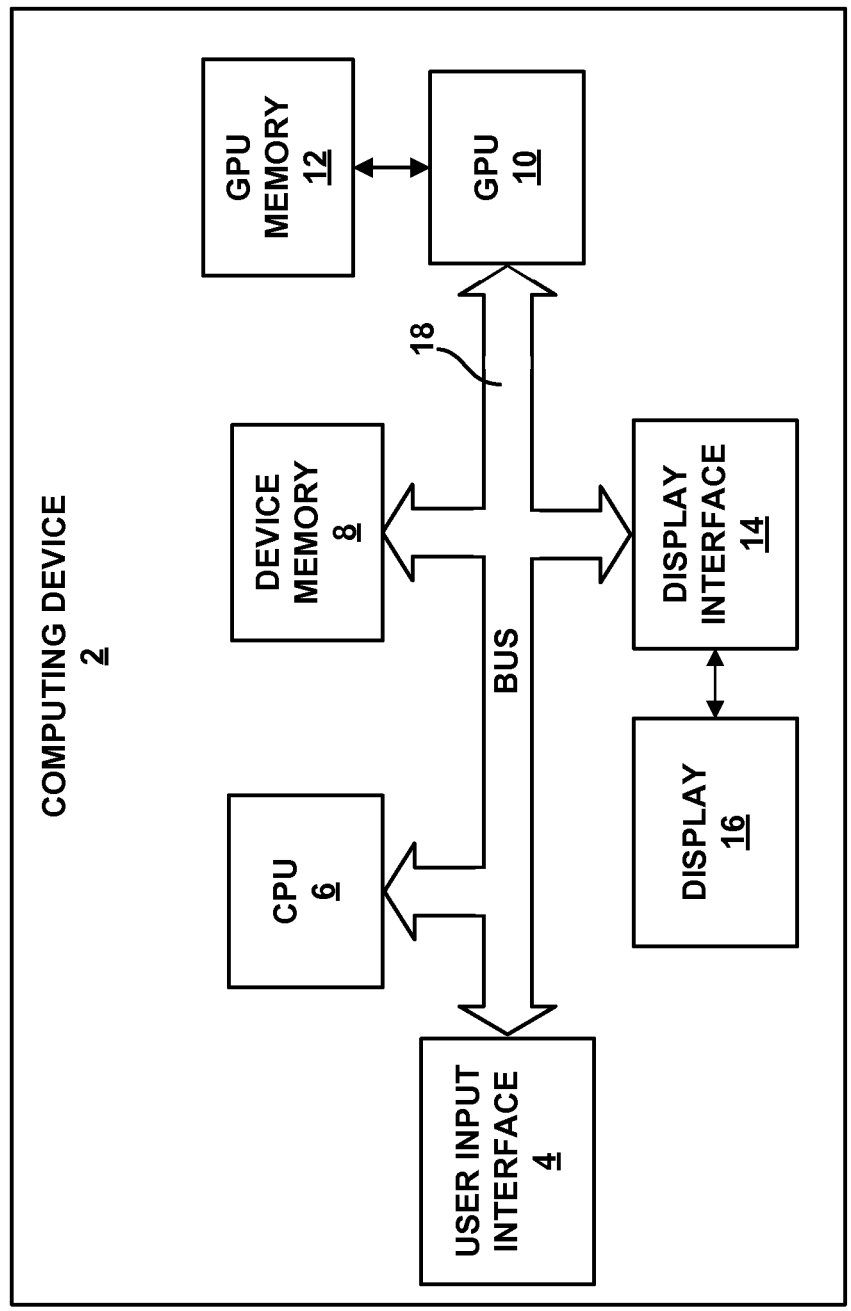
FIG. 1 is a block diagram illustrating an example computing device that performs multi-stage tessellation.

FIG. 1 is a block diagram illustrating an example computing device 2 that performs multi-stage tessellation in accordance with the techniques described in this disclosure. Computing device 2 may comprise a personal computer, a desktop computer, a laptop computer, a computer workstation, a video game platform or console, a cellular or satellite telephone, a landline telephone, an Internet telephone, a handheld device such as a portable video game device or a personal digital assistant (PDA), a personal music player, a video player, a television, a server, an intermediate network device, a mainframe computer or another type of device that outputs graphical information.

As illustrated in the example of FIG. 1, computing device 2 includes a user input interface 4, a CPU 6, a device memory 8, a GPU 10, a GPU memory 12, a display interface 14 and a display 16. User input interface 4, CPU 6, device memory 8, GPU 10 and display interface 14 may communicate using a bus 18. Bus 18 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect.

CPU 6 may comprise a general-purpose or a special-purpose processor that controls operation of computing device 2. A user may provide input to computing device 2 to cause CPU 6 to execute one or more software applications. The software applications that execute on CPU 6 may include a word processor application, a spread sheet application, a media player application, a video game application, a graphical user interface application or another end-user program. The user may provide input to computing device 2 via one or more input devices (not shown) such as a keyboard, a mouse, a microphone, a touch pad or another input device that is coupled to computing device 2 via user input interface 4.

Device memory 8 may store device configuration information that may be used at start-up or reset to configure computing device 2. Device memory may also store data and/or program modules that are immediately accessible and/or presently being operated on by CPU 6. Device memory 8 may additionally store information from other components of computing device 2, such as information output by GPU 10. Device memory 8 may be one or more volatile or non-volatile memory or storage device, such as random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 10 may be dedicated to performing graphics operations to render computerized graphics on display 16. Thus, when one of the software applications executing on CPU 6 requires graphics processing, CPU 6 provides the graphics information to GPU 10 for rendering to display 16. GPU 10 may, in some instances, be built with a parallel structure that provides more efficient processing of complex graphic-related operations than CPU 6. The parallel nature of GPU 10 may allow GPU 10 to create complex, two-dimensional (2D) or three-dimensional (3D) images on display 16 more quickly than drawing the images directly to display 16 with CPU 6. In some instances, GPU 10 may be integrated into a motherboard of computing device 2. In other instances, GPU 10 may be present on a graphics card that is installed in a port in the motherboard of computing device 2 or may be otherwise incorporated within a peripheral device configured to interoperate with computing device 2. GPU 10 may be one or more processors, such as one or more microprocessors, application specific integrated circuits (ASICs), field programmable gate arrays (FPGAs), digital signal processors (DSPs), or other equivalent integrated or discrete logic circuitry.

GPU 10 may be directly coupled to GPU memory 12. Thus, GPU 10 may read data from and write data to GPU memory 12 without using bus 18. In other words, GPU 10 may process data locally using a local storage, instead of off chip memory. This allows GPU 10 to operate in a more efficient manner by eliminating the need of GPU 10 to read and write data via bus 18, which may experience heavy bus traffic. In some instances, however, GPU 10 may not include a separate memory, but instead utilize device memory 8 via bus 18. GPU memory 12 may be one or more volatile or non-volatile memory or storage device, such as random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 10 may provide image information to display interface 14 for presentation via display 16. In the case of complex 2D and 3D graphics, the image information is typically generated by GPU 10 for display 16. Display 16 may comprise a monitor, a television, a projection device, a liquid crystal display (LCD), a plasma display panel, a light emitting diode (LED) array, a cathode ray tube display, electronic paper, a surface-conduction electron-emitted display (SED), a laser television display, a nanocrystal display or another type of display unit. Display 16 may be integrated within computing device 2. For instance, display 16 may be a screen of a mobile telephone. Alternatively, display 16 may be a stand-alone device coupled to computer device 2 via a wired or wireless communications link. For instance, display 16 may be a computer monitor or flat panel display connected to a personal computer via a cable or wireless link.

When one of the software applications executing on CPU 6 desires to present a complex 2D or 3D graphics image, CPU 6 and GPU 10 operate together to render the graphics to display 16. In the case of a video game application, for example, the software application may desire to present a series of video frames in a sequence to provide the video gaming experience to the user. The software application includes commands that define one or more curves that form the graphics image to be displayed. In the case of a video game application, for example, the video game application may include commands that define curves of a graphical image of a scene of the video game. The commands may, for example, define a number of curves that define boundaries of a character and objects within a background.

In one example, the software application may include commands that define a plurality of paths, i.e., curves, in accordance with OpenVG, as defined in a document "OpenVG Specification, Version 1.0," Jul. 28, 2005. OpenVG is a set of commands that allow for the specification of graphical images in 2D or 3D using one or more segment commands. In accordance with the OpenVG Specification, the segment commands may define straight line segments, Bezier curve segments or elliptical arc segments. Extensions of OpenVG may specify other types of segments. Therefore, the techniques of this disclosure are not limited to the segment commands currently defined in the OpenVG specification. Moreover, although the techniques of this disclosure are described in the context of OpenVG, the techniques may be used in the context of other graphics authoring standards, such as OpenGL, Direct3D, Graphics Device Interface (GDI), Quartz, QuickDraw or the like.

To render a curve to display 16, CPU 6 and/or GPU 10 tessellate the curve into line segments using the multi-stage tessellation techniques described in this disclosure. In one aspect, CPU 6 may perform a first tessellation stage to divide the curve into line segments and GPU 10 may perform a second tessellation stage to further divide the curve into additional line segments. In this example, CPU 6 tessellates the curve into a first set of line segments that coarsely represent a shape of the curve during the first tessellation stage. Each of the line segments of the curve represents a portion of the curve. During the second tessellation stage, GPU 10 tessellates the portion of the curve represented by each of the line segments into additional line segments that more finely represent the shape of the curve. In other words, each portion of the curve that was represented by only one line segment after the first tessellation stage is represented by more than one line segment after the second tessellation stage. GPU 10 may utilize a parallel structure to tessellate multiple portions of the curve represented by two or more line segments in parallel. In this manner, in some aspects, computing device 2 may utilize the acceleration capability of GPU 10 to simultaneously operate on multiple portions of the curve in full parallel, thus resulting in improved rendering performance.

The amount of tessellation performed by CPU 6 may vary as a function of a processing load on CPU 6 and/or a processing load on GPU 10. As described above, CPU 6 may execute multiple software applications at a time, each of which uses processing resources of CPU 6 to perform computational tasks. If CPU 6 is lightly loaded with other computational tasks when the graphics-related application desires graphics processing, e.g., when the processing load of CPU 6 is less than or equal to a threshold, CPU 6 may tessellate the curve into more line segments. This will result in a reduced tessellation workload for GPU 10 as the GPU will have to tessellate the portions of the curve into fewer additional line segments.

If CPU 6 is heavily loaded with other computational tasks when the graphics-related application desires graphics processing, e.g., when the processing load of CPU 6 is greater than a threshold, CPU 6 may tessellate the curve into a fewer number of line segments. CPU 6 may, for example, be heavily loaded when a game application is executing on the CPU 6 that requires CPU 6 to run tasks such as artificial intelligence that makes the computer play against a human player, compute physical effects in the game, provide sound effect, display game graphics and the like. This will result in a reduced tessellation workload for CPU 6, but increase the tessellation workload of GPU 10 as GPU 10 will have to tessellate the portions of the curve into more additional line segments. The tessellation processing workload may likewise be balanced based on the load of GPU 10 or a combination of the load on CPU 6 and GPU 10. In this manner, computing device 2 may dynamically balance the tessellation workload between CPU 6 and GPU 10 as a function of the available processing resources.

In another example, the multi-stage tessellation of the curve may occur within GPU 10. In this example, CPU 6 does not perform any tessellation of the curve. Instead, a first computing unit within GPU 10 performs the first tessellation stage to divide the curve into first line segments and a second computing unit with GPU 10 performs the second tessellation stage to further divide the portion of the curve represented by the first line segments into additional line segments. In this example, computing device 2 may utilize the acceleration capability of GPU 10 to simultaneously operate on multiple portions of the curve in full parallel during both tessellation stages.

In some instances, the multi-stage tessellation of the curve may include more than two tessellation stages. For example, a first tessellation stage may tessellate the curve into a first set of line segments that each represent a portion of the curve. During a second tessellation stage, the portion of the curve represented by each of the first line segments is tessellated into a second set of line segments such that each portion of the curve that was represented by only one of the first set of line segment after the first tessellation stage is represented by more than one line segment after the second tessellation stage. During a third tessellation stage, the portion of the curve represented by each of the second line segments is tessellated into additional line segments. Any number of tessellation stages may be performed. The tessellation stages may be performed by CPU 6, GPU 10 and/or dedicated tessellation hardware (not illustrated in FIG. 1).

A number of other elements may also be included in computing device 2, but are not specifically illustrated in FIG. 1 for simplicity and ease of illustration. For example, computing device 2 may include dedicated tessellation hardware, such as tessellation hardware 72 illustrated and described in detail in FIG. 7 below. Moreover, the architecture illustrated in FIG. 1 is merely exemplary, as the techniques described in this disclosure may be implemented with a variety of other architectures.

Figure 2:
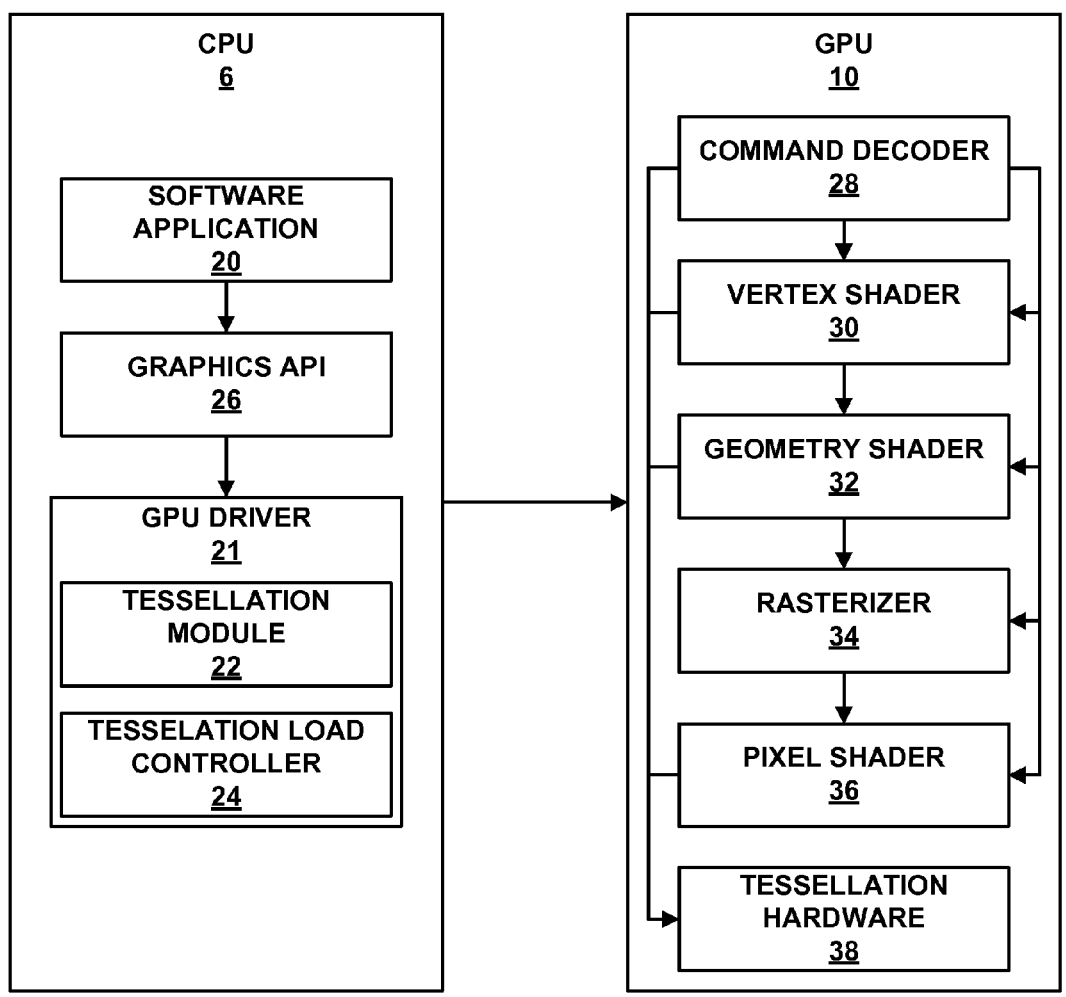
FIG. 2 is a block diagram illustrating a CPU and a GPU that operate together to perform multi-stage tessellation.

FIG. 2 is a block diagram illustrating CPU 6 and GPU 10 of FIG. 1 in further detail. CPU 6 and GPU 10 operate together to tessellate one or more curves of a 2D or 3D graphic image using the multi-stage tessellation described in this disclosure. CPU 6 includes at least one software application 20 executing on CPU 6. Software application 20 executing on CPU 6 may be a video game application, a graphical user interface application, a portable mapping application, a scalable vector graphics (SVG) application, a computer-aided design program for engineering or artistic applications or another type of software application that uses 2D or 3D graphics.

As described above, software application 20 may include commands that define one or more curves that form the graphics image to be displayed. The instructions may conform to any of a variety of graphics authoring standards, i.e., application programming interfaces (APIs), such as OpenVG, OpenGL, Direct3D, Graphics Device Interface (GDI), Quartz, QuickDraw or the like. In the case of OpenVG, for example, a curve is defined by a sequence segment commands. Each segment command of OpenVG may specify a move, a straight line segment, a quadratic or cubic Bezier curve segment or an elliptical arc segment. Thus, each segment command may define a portion of the curve. Software application 20 may include a sequence of segment commands to generate a curve of any shape.

To prepare the curve for rendering to display 16, CPU 6 and/or GPU 10 tessellate the curve into line segments using the multi-stage tessellation techniques described in this disclosure. In one aspect, CPU 6 performs a first tessellation stage and GPU 10 performs a second tessellation stage. Software application 20 may invoke a graphics API 26 that interacts with a GPU driver 21 to cause CPU 6 to perform the first tessellation stage. In particular, GPU driver 21 calls a tessellation module 22 within GPU driver 21 to tessellate the curve during the first tessellation stage. Tessellation module 22 may tessellate each segment (i.e., command) of the curve individually. In other words, tessellation module 22 may operate on one segment of the curve at a time to divide that segment of the curve into line segments. In other instances, tessellation module 22 may tessellate the entire curve. Therefore, the term "curve" as used herein may refer to a curve or a segment of a curve of an object.

Tessellation module 22 tessellates the curve into a first set of line segments. Each of the line segments represents a portion of the curve. In some instances, the first set of line segments may approximate at least the general shape of the curve. However, the first set of line segments do not need to provide a high resolution approximation of the shape of the curve. Tessellation module 22 may, for example, tessellate the curve into a minimum number of line segments needed to conserve the general shape of the curve. In other words, tessellation module 22 may tessellate the curve to produce as few line segments as possible while still preserving the general shape of the curve. In another example, tessellation module 22 may not perform any tessellation of the curve when CPU 6 is heavily loaded, e.g., when the processing load of CPU 6 exceeds a threshold. Instead, CPU 6 may provide the curve information to GPU 10 for multi-stage tessellation. However, this results in an increased work load on GPU 10. Therefore, CPU 6 may be configured to balance the tessellation load between CPU 6 and GPU 10.

To generate the first set of line segments, tessellation module 22 computes one or more vertex points that lie on the curve. Tessellation module 22 may, for example, generate the one or more vertex points using a mathematical representation corresponding to the particular command segment, which may be specified in the graphics authoring specification (e.g., OpenVG). In the case of a curve that is defined using OpenVG as an elliptical arc curve, for example, tessellation module 22 may compute the vertex points using the equations:

$$x=-a*\cos(\theta) \quad (1)$$

$$y=b*\sin(\theta), \quad (2)$$

where (x, y) is a positional coordinate of a vertex point on the curve in the object space, a is a semi-major axis of the ellipse, b a semi-minor axis of the ellipse and $0 \leq \theta \leq 2\pi$. Each of the first set of line segments is a straight line segment that connects each vertex point to its neighboring vertex point. In some instances, tessellation module 22 or other component of CPU 6 may compute an expanded polynomial representation of the curve as described in detail with respect to FIG. 7.

Tessellation module 22 may tessellate the curve to equally divide the curve into the first set of line segments. For example, tessellation module 22 may equally divide the curve into N line segments, where N is equal to any positive integer value. In the elliptical arc curve example above, for instance, tessellation module 22 may incrementally increase the value of $\theta$ from a starting angle $\theta_s$ to an ending angle $\theta_e$ in step sizes of $(\theta_s-\theta_e)/N$ to equally divide the elliptical arc curve into N equal line segments. If the elliptical arc curve is a full ellipse with a starting angle of $\theta_s=0$ and an ending angle of $\theta_e=2\pi$, and N=8, for example, tessellation module 22 may generate eight line segments that connect vertex points located at $\theta_0=\theta_s=0$, $\theta_1\pi/4$, $\theta_2=\pi/2$, $\theta_3=3\pi/4$, $\theta_4=\pi$, $\theta_5=5\pi/4$, $\theta_6=3\pi/2$, $\theta_7=7\pi/4$, $\theta_8=\theta_e=2\pi$. In other instances, tessellation module 22 may adaptively tessellate the curve to divide the curve into more line segments for portions of the curve where the curvature of the curve is bigger and fewer line segments for portions of the curve where the curvature of the curve is smaller. In this manner, the step sizes are non-linear such that tessellation is denser where the curvature of the curve is bigger. Again with reference to the ellipse curve example, tessellation module 22 may generate the step sizes of $\theta$ based on the ratio b/a, such that more line segments are generated near $\theta=0$ and $\theta=\pi$ (i.e., step size of $\theta$ is smaller) and less line segments are generated near $\theta=\pi/2$ and $\theta=3\pi/2$ (i.e., step size of $\theta$ is larger).

Tessellation load controller 24 of GPU driver 21 may compute the number of line segments N based on a load of CPU 6 and/or the load of GPU 10. Tessellation load controller 24 may, for example, receive data regarding the load of CPU 6 from an operating system (not shown) that monitors the load of CPU 6. Thus, CPU 6 may monitor its own work load. Tessellation load controller 24 may additionally monitor the load of GPU 10. Because CPU 6 controls GPU 10 by sending tasks to GPU 10 and monitoring the progress of GPU 10, tessellation load controller 24 can determine the load based on the number of commands sent to GPU 10.

Tessellation module 22 may generate a list of drawing primitives using the generated line segments. Tessellation module 22 may, for example, form the list of drawing primitives using the vertex points of the line segments as at least a portion of the vertex points for the primitives. Tessellation module 22 may generate any of a number of drawing primitives including points, line strips, line loops, separate lines, triangle strips, triangle fans, separate triangles, quadrilateral strips, separate quadrilaterals, or other types of polygons.

CPU 6 may invoke graphics API 26 to communicate the list of drawing primitives, e.g., triangles, to GPU 10 via GPU driver 21. Graphics API 26 may comprise a set of software instructions that provide an interface between CPU 6 and GPU 10. In particular, GPU driver 21 may formulate and issue one or more commands that cause GPU 10 to render to drawing primitives to displayable graphics information. The commands may include vertex points of the primitive, color information associated with each vertex point of the primitive, texture information associated with each vertex point of the primitive, scaling information for the primitive, rotation information for the primitive, and the like. GPU driver 21 may formulate a command that specifies an operation to perform on the primitive. For example, GPU driver 21 may formulate a command that indicates to GPU 10 to perform tessellation and/or rendering of the curve.

When GPU 10 receives a command from CPU 6, command decoder 28 decodes the command and configures one or more processing elements of GPU 10 to perform the operation specified in the command. Command decoder 28 may additionally store information (e.g., primitive or curve information) contained within the command in GPU memory 12 or within one or more buffers (not shown) within GPU 10. Command decoder 28 may load into each of the processing elements of GPU 10 a set of instructions that cause the processing elements to perform particular graphics processing operations. In the example illustrated in FIG. 2, the processing elements of GPU 10 include a vertex shader 30, a geometry shader 32, a rasterizer 34, and a pixel shader 36. In some instances, GPU 10 may also include dedicated tessellation hardware 38. Other processing elements may also be included in GPU 10, but are not specifically illustrated in FIG. 2 for simplicity and ease of illustration.

Vertex shader 30, geometry shader 32, rasterizer 34, and pixel shader 36 operate as a graphics pipeline. When operating as a graphics pipeline, vertex shader 30 performs a first set of one or more graphics operations on a first set of input data received from command decoder 28 or GPU memory 12 and outputs a first set of intermediate results to geometry shader 32. Geometry shader 32 performs a second set of one or more graphics operations on the intermediate results received from vertex shader 30 and outputs a second set of intermediate results to rasterizer 34. While geometry shader 32 performs the second set of graphics operations, vertex shader 30 performs the first set of graphics operations on a second set of initial input data received from command decoder 22. Graphics processing continues in a similar manner until the graphics image is generated for display.

Moreover, GPU 10 may have a highly-parallel structure that provides more efficient processing of complex graphics-related operations than CPU 6. Although only one graphics pipeline is illustrated in FIG. 2, GPU 10 may include a plurality of similar graphics pipelines that operate on multiple data primitives in parallel. In other words, GPU 10 may include a plurality of vertex shaders, geometry shaders, rasterizers, and pixel shaders that may operate on several data primitives in full parallel. Thus, highly parallel nature of GPU 10 may, in some instances, allow GPU 10 to create complex, 2D or 3D graphics images on display 16 more quickly than drawing the graphics images directly to display 16 with CPU 6.

Vertex shader 30 operates on a single vertex at a time. Vertex shader may be configured to receive a sequence of one or more vertex attributes that define a single vertex. Conventional vertex attributes include a position attribute, a normal attribute, one or more color attributes, one or more texture attributes, one or more lighting attributes and the like. Moreover, vertex shader 30 may be configured to receive one or more custom vertex attributes, depending on the graphics operations for which vertex shader 30 is being used. In some instances, the number of vertex attributes that can be used to define each vertex may be limited to a particular maximum number of attributes.

Vertex shader 30 may perform a number of graphics operations on the vertex. For example, vertex shader 30 may be configured to transform the input vertex into a different coordinate system. In particular, vertex shader 30 transforms the position attribute of the vertex received as input from an object coordinate space to a device coordinate space. The object coordinate space represents how a graphics image is defined by the instructions of software application 20. The device coordinate space represents how the graphics image will be displayed on a device, e.g., display 16. Vertex shader 30 may, for example, transform the vertex coordinates using affine operations such as rotation, translation, scaling and the like. In one example, vertex shader 30 may transform the vertex coordinates using the equation, $$(X', Y', 1) = (X, Y, 1) * \begin{bmatrix} Scale\_x & Rotate\_y & 0 \\ Rotate\_x & Scale\_y & 0 \\ Trans\_x & Trans\_y & 1 \end{bmatrix} \quad (3)$$

where (X', Y', 1) is a vertex position in the device coordinate space, (X, Y, 1) is a vertex position in the object coordinate space, Scale_x is a scaling factor along the x-axis, Scale_y is a scaling factor along the y-axis, Rotate_x is a rotation around the x-axis, Rotate_y is a rotation around the y-axis, Trans_x is a translation along the x-axis and Trans_y is a translation along the y-axis. These variables may be specified in the instructions of software application 20, provided to GPU 10 via graphics API 26 and configured within vertex shader 30 by command decoder 28.

In some instances, vertex shader 30 may compute the transform once for the curve. In other words, vertex shader 30 may compute the transformation of the equations used to define the curve instead of computing the transformation for every vertex point through the path. In the case of the elliptical arc curve example above, vertex shader 30 may transform the curve to define a mathematical representation of the elliptical arc curve after transformation as:

$$x' = x_t - a * \cos(\theta) * Sf \quad (4)$$

$$y' = y_t + b * \sin(\theta) * Sf, \quad (5)$$

where (x', y') is a positional coordinate in the device coordinate space, $x_t$ is a translation along the x-axis, $y_t$ is a translation along the y-axis and Sf is a scale factor of the transformation. Equations (4) and (5) assume that vertex shader 30 only translates and scales the curve (i.e., no rotation of the curve). In some instances, CPU 6 may perform the transformation instead of vertex shader 30.

Vertex shader 30 may perform a number of other operations on the input vertex attributes. Vertex shader 30 may perform one or more operations to change one or more of the color attributes of the vertex, one or more of the texture attributes of the vertex, one or more of the lighting attributes of the vertex or the like. Vertex shader 30 may be configured to change every vertex in the same way or change only vertices that have certain properties. Thus, vertex shader 30 may be configured to perform one set of operations on one vertex and then re-configured to perform a different set of operations on the next vertex.

Geometry shader 32 operates on primitives instead of individual vertex points. Geometry shader 32 receives a string of vertex points (or attributes that define vertex points) and forms the primitives. In the case of a triangle primitive, geometry shader 32 may input three sets of vertex attributes that define three vertex points of the triangle primitive. In some cases, geometry shader 32 may additionally input vertex attributes for vertex points of adjacent primitives. Geometry shader 32 may discard the primitive or generate one or more new primitives using the vertex attributes of the vertex points of the input primitive. In some cases, GPU 10 may not include geometry shader 32.

Rasterizer 34 converts the primitives output by geometry shader 32, or vertex shader in the case in which there is no geometry shader 32, into pixels based on the vertex attributes. Rasterizer 34 may perform clipping operations on the primitives and prepare the primitives for pixel shader 36. Rasterizer 34 may determine which of the pixels in the screen are within the geometry of the object and therefore need to be drawn. Additionally, rasterizer 34 performs interpolation of the vertex data to generate the pixel data. The output of rasterizer 34 is provided to pixel shader 36. Pixel shader 36 (sometimes referred to as a fragment shader) performs graphics operations on each pixel to be displayed on display 16. Pixel shader 36 may, for example, perform per-pixel texturing, fog and coloring operations to generate a color value to display at each pixel location.

In accordance with the techniques of this disclosure, GPU 10 may be configured to perform at least a second tessellation stage to tessellate the curve into additional line segments. For example, shader 30, 32 or 36 may perform the second tessellation stage to sub-divide the portions of the curve represented by the line segments from CPU 6 into additional line segments that more accurately represent the portion of the curve. As another example, dedicated tessellation hardware 38 may perform the second tessellation stage to sub-divide the portions of the curve represented by the line segments from CPU 6 into additional line segments that more accurately represent the portion of the curve. In either case the second tessellation stage results in the portion of the curve represented by each of the line segments generated by CPU 6 being subdivided into a second set of more detailed line segments (or sub-segments). Shader 30, 32 or 36 or tessellation hardware 38 tessellates the original curve into additional line segments. In other words, shader 30, 32 or 36 or tessellation hardware 38 does not divide the line segments produced by CPU 6 into additional line segments, but the actual curve defined by software application 20. In this manner, each portion of the curve that was represented by only one line segment after the first tessellation stage is represented by more than one line segment after the second tessellation stage. The additional line segments result in a better representation of the curve, e.g., a higher resolution representation of the curve.

Shader 30, 32 or 36 or tessellation hardware 38 may perform the second tessellation stage based on the amount of scaling performed during the transformation. In particular, the number of additional line segments into which shader 30, 32 or 36 or tessellation hardware 38 tessellates the portion of the curve represented by each of the line segments is a function of a scale factor. The scale factor is an approximation of the amount of scaling that occurred during the transformation of the vertex points from the object coordinate space to the device coordinate space. CPU 6 may compute the scale factor and provide it to one or more components of GPU 10 for use in determining the number of additional line segments for the second tessellation stage. CPU 6 may compute the scale factor using any of a variety of different techniques. The techniques may result in different values for the scale factor, but all of the resulting values generally represent the amount of scaling performed during the transformation. CPU 6 may compute the scale factor using the transformation matrix. For example, CPU 6 may compute the scale factor as a multiplication of Scale_x and Scale_y i.e., the scaling variables used during the transformation of coordinate spaces. In another example, CPU 6 may compute the scaling factor as a maximum value of Scale_x and Scale_y. In the case of 3D, CPU 6 may compute the scale factor by a viewport scale factor and/or the transformation matrix.

Shader 30, 32 or 36 or tessellation hardware 38 subdivides the portion of the curve represented by the line segments into more additional line segments as the scale factor increases. Thus, the number of additional line segments (or sub-segments) M to tessellate each portion of the curve may be computed as a function of the scale factor. Subdividing the portion of the curve as a function of the scale factor allows shader 30, 32 or 36 or tessellation hardware 38 to preserve more detail of the curve when the curve is scaled heavily, while allowing for less detail of the curve when the curve is not scaled or only lightly scaled. In this manner, the multi-stage tessellation techniques described in this disclosure allow for dynamic tessellation that is adaptive to a resolution requirement of the graphics image. When high resolution is needed (e.g., large scaling) shader 30, 32 or 36 or tessellation hardware 38 tessellates the curve more and when high resolution is unnecessary (e.g., little or no scaling) shader 30, 32 or 36 or tessellation hardware 38 tessellates the curve less and GPU processing resources are saved. Thus, instead of over-tessellating the curve to ensure quality, the techniques of this disclosure produce the additional line segments as needed based on the scaling. Therefore, no extra line segments are sent through the graphics pipeline, thereby improving pipeline performance and power consumption by utilizing the computing resources in a more efficient way.

The number of additional line segments or sub-segments to tessellate each portion of the curve into may be loaded into shader 30, 32 or 36 or tessellation hardware 38 as a global constant. Shader 30, 32 or 36 or tessellation hardware 38 tessellates the portion of the curve represented by one of the line segments provided by CPU 6 into M additional line segments. The M additional line segments generated by shader 30, 32 or 36 or tessellation hardware 38 represent a further tessellation of the original curve. Thus, instead of representing the portion of the curve with a single line segment generated by CPU 6, the portion of the curve is represented by the M line segments. Again, the M sub-segments represent tessellations of the original curve and not tessellations of the line segments provided by CPU 6. In this manner, shader 30, 32 or 36 or tessellation hardware 38 further approximates the curve instead of further approximating the line segments provided by CPU 6.

With respect to the elliptical arc curve defined by equations (1) and (2) above, shader 30, 32 or 36 or tessellation hardware 38 may divide the portion of the curve represented by one of the line segments from CPU 6 into additional line segments. For example, shader 30, 32 or 36 or tessellation hardware 38 may divide the portion of the curve corresponding with the line segment from the vertex located at $\theta_0=0$ to the vertex located at $\theta_1=\pi/4$ into M additional line segments. If M=4, for example, shader 30, 32 or 36 or tessellation hardware 38 further tessellates the portion of the curve from the vertex located at $\theta_0=0$ to the vertex located at $\theta_1=\pi/4$ into four additional line segments. In particular, in this example, shader 30, 32 or 36 or tessellation hardware 38 may generate four additional line segments that connect vertex points located at $\theta_{00}=\theta_0=0$, $\theta_{01}=\pi/16$, $\theta_{02}=\pi/8$, $\theta_{03}=3\pi/16$, $\theta_{04}=\theta_1=\pi/4$. The vertex points of the four additional line segments may be computed using a mathematical representation of the elliptical curve after transformation as provided in equations (4) and (5) above.

GPU 10 may tessellate the other portions of the curve represented by the other seven line segments 44 generated by CPU 6 in a similar manner in full parallel. Thus, GPU 10 performs the second tessellation stage on multiple portions of the curve simultaneously. In this manner, computing device 2 may utilize a parallel structure of GPU 10 to perform the second tessellation stage for the portions of the curve represented by other ones of the line segments produced by CPU 6 in full parallel. Doing so results in GPU acceleration of the tessellation of the curve, thereby improving the rendering performance.

In one instance, geometry shader 32 may perform the second tessellation stage of the portions of the curve. As described above, geometry shader 32 operates on multiple vertex points (e.g., primitives) at a time instead of individual vertex. As such, geometry shader 32 may output multiple vertex points, thereby tessellating the portion of the curve into M additional line segments in a single step. In some cases, geometry shader 32 may be configured such that each different portion of the curve is divided into a different number of additional line segments, and thus may dynamically tessellate the portion of the curve based on shape of the portion of the curve. Tessellation of the portion of the curve into additional line segments using geometry shader 32 is described in more detail with respect to FIG. 3.

In another instance, vertex shader 30 may perform the second tessellation stage of the portions of the curve. This may be the case, for example, when GPU 10 does not include geometry shader 32. As described above, vertex shader 30 operates on a single vertex at a time and is therefore typically unable to generate additional vertices. Vertex shader 30 may be configured, however, to input one or more custom vertex attributes to perform the second tessellation stage. In particular, vertex shader 30 may be configured such that the vertex attributes that are input to define a vertex actually define a line segment instead of a single vertex of the line segment. In this manner, vertex shader 30 may be viewed as inputting a "virtual vertex" since it does not actually represent a single vertex. For example, vertex shader 30 may be configured to input vertex attributes that include a start vertex attribute and an end vertex attribute of the line segment. The start vertex attribute represents the vertex at which the line segment begins and the end vertex attribute represents the vertex at which the line segment ends. Vertex shader 30 operates on the start vertex attribute and the end vertex attribute to tessellate the portion of the curve into additional line segments. An example of tessellation of the portion of the curve into additional line segments using vertex shader 30 is described in more detail with respect to FIG. 4.

In another instance, pixel shader 36 may perform the second tessellation stage of the portions of the curve. Like the vertex shader 30, pixel shader 36 operates on a single pixel at a time. Thus, pixel shader 36 is configured to input one or more custom pixel attributes that define a line segment instead of a single pixel of the line segment. Pixel shader 36 generates additional pixel attributes that further define additional line segments.

In another instance, tessellation hardware 38 may perform the second tessellation stage of the portions of the curve. Tessellation hardware 38 may, for example, include one or more multiply and accumulation (MAC) operation units to perform the second tessellation stage. In one instance, tessellation hardware 38 may be formed of a pipelined array of MAC operation units that are configurable to compute polynomials of different degrees as described in detail below. In this case, tessellation hardware 38 inputs polynomial coefficients and at least one location along the curve at which to generate vertex points from CPU 6. The locations along the curve at which to generate vertex points may, for example, be a value of t in the case of Bezier curves or a value of θ in the case of elliptical arc curves. The MAC operation units of tessellation hardware 38 operate on the polynomial coefficients to generate one or more coordinates of vertex points at the particular locations. Operation of tessellation hardware 38 is substantially similar to that of tessellation hardware circuitry 72 described in detail below.

Figure 7:
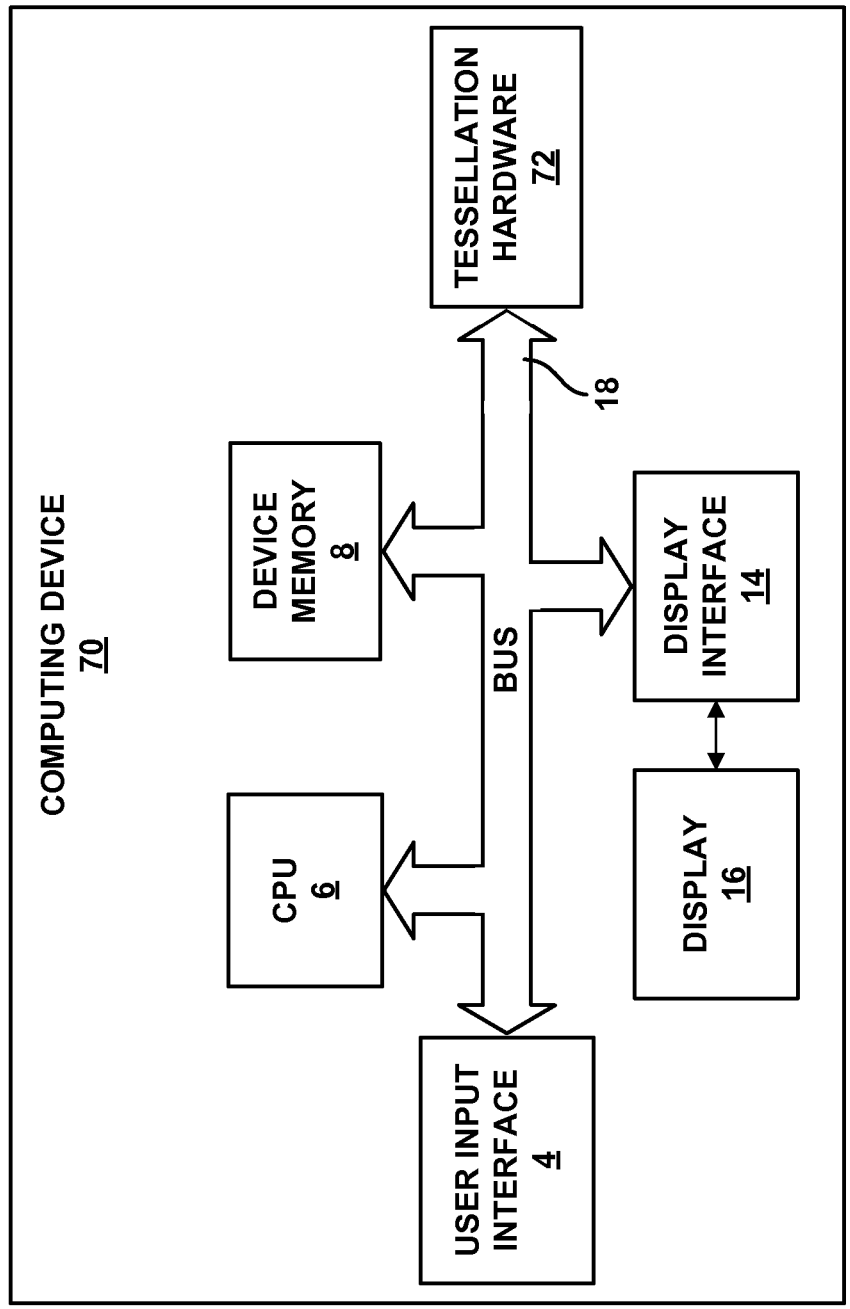
FIG. 7 is a block diagram illustrating another example computing device that performs multi-stage tessellation.

Although the multi-stage tessellation described above is distributed between CPU 6 and GPU 10, the multi-stage tessellation may be performed within GPU 10 and/or distributed between GPU 10 and dedicated tessellation hardware (e.g., tessellation hardware 72 illustrated in FIG. 7). Thus, CPU 6 does not have to perform any tessellation of the curve. Instead, a first computing unit within GPU 10 performs the first tessellation stage to divide the curve into line segments and a second computing unit with GPU 10 performs the second tessellation stage to further divide the curve into additional line segments. For example, the tessellation may be divided between any combination of vertex shader 30, geometry shader 32, pixel shader 36, and tessellation hardware 38 or between those components and dedicated tessellation hardware (e.g., tessellation hardware 72).

Although the multi-stage tessellation technique is described above as including two stages, the multi-stage tessellation technique may include more than two stages. For example, the multi-stage tessellation may include a first tessellation stage may tessellate the curve into a first set of line segments, a second tessellation stage that tessellates the portion of the curve represented by each of the first set of line segments into second sets of line segments, and a third tessellation stage that tessellates the portion of the curve represented by each of the second set of line segments into additional line segments. Any number of tessellation stages may be performed. The tessellation stages may be distributed between any of CPU 6, vertex shader 30, geometry shader 32, pixel shader 36 and/or tessellation hardware 38, 72 (FIG. 7).

The architecture illustrated in FIG. 2 is merely exemplary, as the techniques described in this disclosure may be implemented with a variety of other architectures. For example, GPU 10 may utilize a single shader core that may perform the functions attributed to vertex shader 30, geometry shader 32 and pixel shader 36. The single shader core may, for example, be configured by command decoder 28 to function as vertex shader 30, geometry shader 32 and pixel shader 36 based on the stage of the pipeline at which the graphics operations are at. As another example, tessellation hardware 38 may not be located within GPU 10, but instead be a separate component of computing device 2 (FIG. 1) and coupled to GPU 10 via bus 18 as illustrated in FIG. 7. Moreover, the features illustrated in FIG. 1 may be realized by any suitable combination of hardware and/or software components.

Figure 3A:
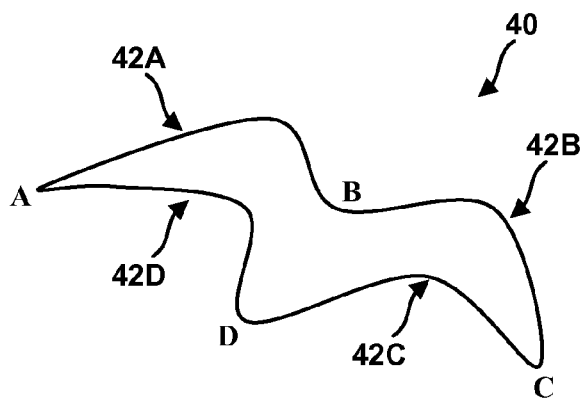
FIGS. 3A-3D are diagrams illustrating an example two-stage tessellation of a curve.

FIGS. 3A-3D are diagrams illustrating example two-stage tessellation of a curve 40. FIG. 3A illustrates curve 40 as defined by software application 20 (FIG. 2). Curve 40 is defined as a sequence of four Bezier curve segments: a first Bezier curve segment 42A from point A to point B, a second Bezier curve segment 42B from point B to point C, a third Bezier curve segment 42C from point C to point D and a fourth Bezier curve segment 42D from point D back to point A. To render curve 40 to display 16, CPU 6 and/or GPU 10 tessellate curve 40 into line segments using the multi-stage tessellation techniques described in this disclosure. As described above, tessellation module 22 of CPU 6 may, in some aspects, tessellate a portion of curve 40 at a time. In the example of tessellation illustrated in FIGS. 3B-3D, CPU 6 and/or GPU 10 tessellate Bezier curve segment 42A. CPU 6 and/or GPU 10 may tessellate Bezier curve segments 42B-42D in a similar manner.

Figure 3B:
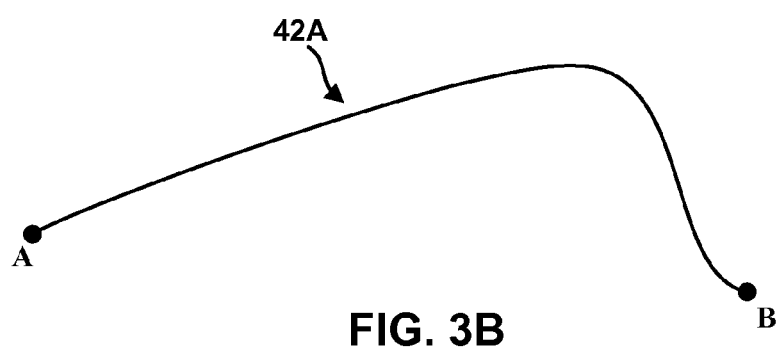

FIG. 3B illustrates the portion of curve 40 defined by Bezier curve segment 42A between point A and point B. Bezier curve segment 42A may be defined by software application 20 as a polynomial curve defined using a parametric representation. In particular, Bezier curve segment 42A may be represented as the set of points of the form (x(t), y(t)), where x(t) and y(t) are polynomials of t and t varies continuously from 0 to 1. Bezier curve segment 42A illustrated in FIG. 3 is a cubic Bezier curve segment, which may be represented in the object coordinate space by equations:

$$x(t) = x_s*(1-t)^3 + 3*(1-t)^2*t*x_{c1} + 3*(1-t)*t^2*x_{c2} + t^3*x_e \quad (6)$$

$$y(t) = y_s*(1-t) + 3*(1-t)^2*t*x_{c1} + 3*(1-t)*t^2*y_{c2} + t^3*y_e \quad (7)$$

where $(x_s, y_s)$ is a start point of Bezier curve segment 42A, $(x_e, y_e)$ is an end point of Bezier curve segment 42A and $(x_{c1}, y_{c1})$ and $(x_{c2}, y_{c2})$ are two internal control points.

Figure 3C:
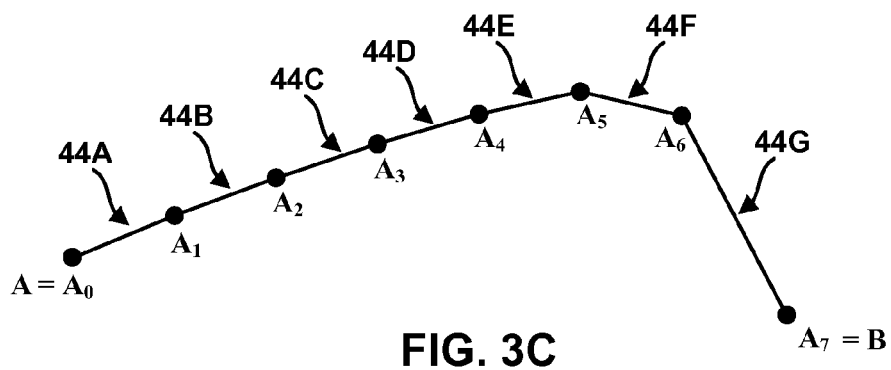

A first computing unit tessellates Bezier curve segment 42A (i.e., the portion of curve 40 between point A and point B) into a plurality of line segments 44A-44G (collectively "line segments 44"). FIG. 3C illustrates Bezier curve segment 42A after tessellation by the first computing unit. In one instance, the first computing unit that performs the first tessellation stage may be tessellation module 22 of CPU 6. In other instances, the first computing unit may be one of shaders 30, 32 or 36 or tessellation hardware 38. In the example illustrated in FIG. 3C, the first computing unit tessellates Bezier curve segment 42A into seven line segments 44. In particular, the first computing unit computes vertex points along Bezier curve segment 42A using equations (6) and (7) above.

When the first computing unit is tessellation module 22, tessellation load controller 24 may configure tessellation module 22 to tessellate the curve into a particular number of line segments as a function of the load of CPU 6, the load of GPU 10 or a combination thereof. Tessellation load controller 24 may, for example, increase the number of line segments generated by tessellation module 22 when the load of CPU 6 is less than or equal to a threshold and decrease the number of line segments when the load of CPU 6 exceeds the threshold. In the example illustrated in FIG. 3C, tessellation load controller 24 configures tessellation module 22 to tessellate Bezier curve segment 42A into seven line segments 44. Tessellation load controller 24 may configure tessellation module 22 to tessellate Bezier curve segment 42A into more line segments or less line segments using the tessellation load balancing techniques described above. In the example of FIG. 3C, line segments 44 coarsely represent the shape of the curve, i.e., Bezier curve segment 42A.

To tessellate Bezier curve segment 42A into line segments 44, the first computing unit computes one or more vertex points between start point $(x_s, y_s)$, which is equal to vertex point $A_0$, and end point $(x_e, y_e)$, which is equal to vertex point $A_7$. To do so, the first computing unit may use the equations that represent Bezier curve segment 42A, i.e., equations (6) and (7), to compute the vertex points between $A_0$ (i.e., A) and $A_7$ (i.e., B). In the example illustrated in FIG. 3C, the first computing unit computes vertex points $A_1$-$A_6$. $A_0$ and $A_7$ are already known as they are equal to start point $(x_s, y_s)$ and end point $(x_e, y_e)$, respectively.

The first computing unit then represents Bezier curve segment 42A as a plurality of line segments 44 between the generated vertex points. In particular, the first computing unit represents Bezier curve segment 42A as line segment 44A from vertex point $A_0$ (which is the same as point A of FIGS. 3A and 3B) to vertex point $A_1$, line segment 44B from vertex point $A_1$ to vertex point $A_2$, line segment 44C from vertex point $A_2$ to vertex point $A_3$ and so on.

In the example illustrated in FIG. 3C, the first computing unit equally divides Bezier curve segment 44A into line segments 44. In other words, the first computing unit incrementally increases t by a constant step size. In some instances, however, the first computing unit may use adaptive tessellation techniques to tessellate Bezier curve segment 44A based on a shape of the curve, i.e., with different step sizes for each line segment. For example, the first computing unit may increment t with a smaller step size when the curvature of the curve is bigger (e.g., between vertex points $A_5$ and $A_7$ in the example) and increment t with a larger step size when the curvature of the curve is smaller (e.g., between points $A_0$ and $A_5$).

Rendering line segments 44 without any further tessellation may result in a poor image quality for some portions of Bezier curve 42A, especially between vertex point $A_5$ and $A_7$. This is particularly true when the curve is zoomed-in to a high resolution, e.g., upon application of a large scale factor during transformation by GPU 10 into the device coordinate space. Therefore, a second computing unit performs a second tessellation stage to tessellate Bezier curve segment 42A into additional line segments. The second computing unit may, for example, be one of shaders 30, 32 or 36 or tessellation hardware 38. As will be described in more detail below, the second tessellation stage tessellates the portions of Bezier curve segment 42A represented by line segments 44 instead of actually tessellating line segments 44. Tessellation of Bezier curve segment 42A into additional line segments will be described with respect to tessellation of a portion of the Bezier curve segment 42A represented by line segment 44A for example purposes. However, the second computing unit may tessellate line segments 44B-44G in a similar fashion in full parallel.

Prior to performing the second tessellation stage, vertex shader 30 of GPU 10 or CPU 6 transforms the curve from an object coordinate space to a device coordinate space. Vertex shader 30 or CPU 6 may, for example, transform the points defining the curve using the equation (3) above instead of converting each vertex point of each line segment. Vertex shader 30 or CPU 6 may transform the start point $(x_s, y_s)$, the end point $(x_e, y_e)$ and internal control points $(x_{c1}, y_{c1})$ and $(x_{c2}, y_{c2})$ into the device coordinate space $(x'_s, y'_s)$, $(x'_e, y'_e)$, $(x'_{c1}, y'_{c1})$ and $(x'_{c2}, y'_{c2})$. In this manner, the portion of Bezier curve 42A is transformed into the device coordinate space, and can be defined as:

$$x'(t) = x'_s*(1-t)^3 + 3*(1-t)^2*t*x'_{c1} + 3*(1-t)*t^2*x'_{c2} + t^3*x'_e \quad (8)$$

$$y'(t) = y'_s*(1-t) + 3*(1-t)^2*t*x'_{c1} + 3*(1-t)*t^2*y'_{c2} + t^3*y_e \quad (9)$$

Figure 3D:
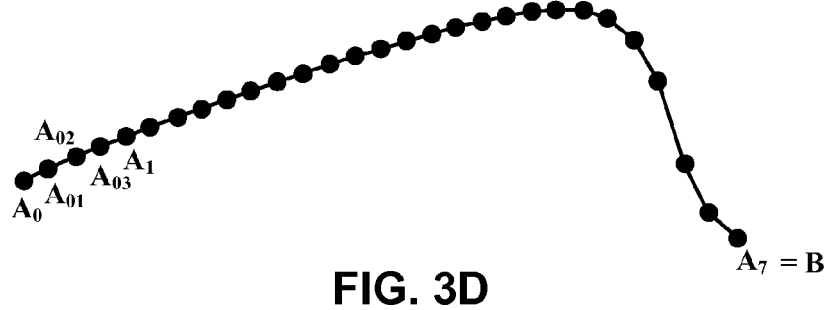

After the transformation, the second computing unit performs a second tessellation stage to tessellate the portion of Bezier curve segment 42A represented by line segment 44A (i.e., the portion of Bezier curve segment 42A from $A_o$ to $A_1$) into additional line segments. The portion of Bezier curve segment 42A represented by line segment 44A is the portion of Bezier curve segment 42A between vertex points $A_0$ and $A_1$. In the example illustrated in FIG. 3D, the second computing unit tessellates the portion of Bezier curve segment 42A between vertex points $A_0$ and $A_1$ into four line segments. In particular, the second computing unit generates vertex points $A_{01}$, $A_{02}$ and $A_{03}$ between vertex points $A_0$ and $A_1$. The second tessellation stage results in the portion of Bezier curve segment 42A between vertex points $A_0$ and $A_1$ being represented by four line segments instead of only a single line segment, thus providing more detail with respect to the portion of the curve. As illustrated in FIG. 3D, the additional line segments generated during the second tessellation stage provide a better representation of the curve, particularly between vertex point $A_5$ and $A_7$.

In one aspect, the number of additional line segments into which the second computing unit tessellates the portion of the curve represented by each of the line segments may be a function of a scale factor. The second computing unit subdivides the portion of the curve represented by the line segments 44 into more additional line segments as the scale factor increases. Subdividing the portion of the curve as a function of the scale factor allows the second computing unit to preserve more detail of the curve when the curve is scaled heavily, while allowing for less detail of the curve when the curve is not scaled or only lightly scaled.

The techniques may be applied in a similar manner to other curves defined in OpenVG, such as elliptical arc curves defined in accordance with equations (1) and (2) or quadratic Bezier curves that include a start point at $(x_s, y_s)$, an end point $(x_e, y_e)$ and a control point $(x_c, y_c)$, and can be defined in the object coordinate space as:

$$x(t) = x_s*(1-t)^2 + 2*(1-t)*t*x_c + t^2*x_e \quad (10)$$

$$y(t) = y_s*(1-t)^2 + 2*(1-t)*t*y_c + t^2*y_e \quad (11)$$

Moreover, the techniques may be utilized with any curve definitions that are added to the OpenVG standard through any extensions. Likewise, the techniques may be used to tessellate curves defined using other graphics authoring standards.

Figure 4A:
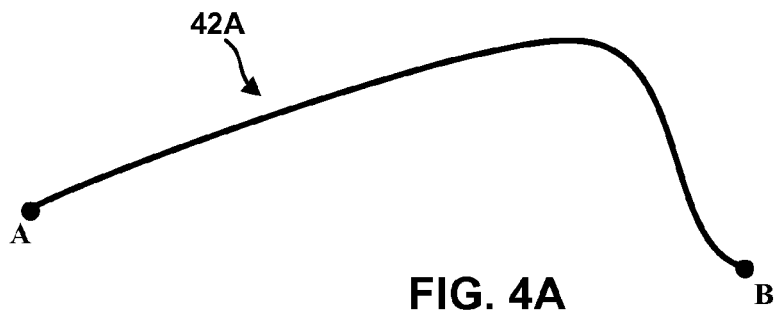
FIGS. 4A-4D are diagrams illustrating another example multi-stage tessellation of a curve.

FIGS. 4A-4D are diagrams illustrating an example of multi-stage tessellation of a curve. FIG. 4A illustrates a Bezier curve segment 42A between point A and point B. As described above with respect to FIG. 3, Bezier curve segment 42A may be represented in the object coordinate space by equations (6) and (7) above.

Figure 4B:
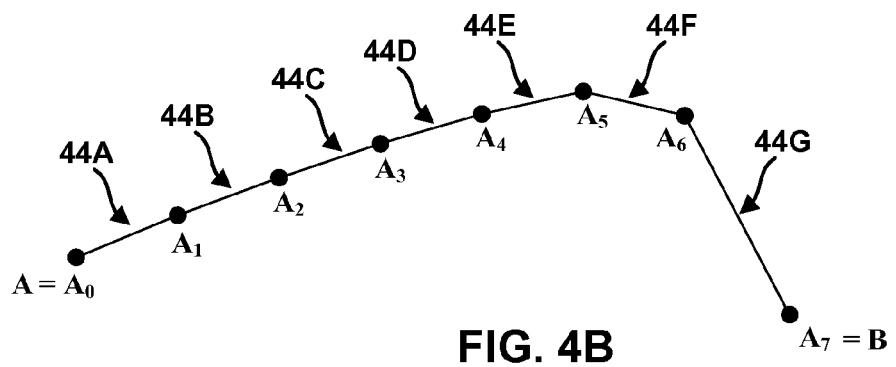

A first computing unit tessellates Bezier curve segment 42A (i.e., the portion of curve 40 between point A and point B) into a plurality of line segments 44A-44G (collectively "line segments 44"). In one instance, the first computing unit that performs the first tessellation stage may be tessellation module 22 of CPU 6. In other instances, the first computing unit may be one of shaders 30, 32 or 36 or tessellation hardware 38. FIG. 4B illustrates Bezier curve segment 42A after tessellation by the first computing unit. In the example illustrated in FIG. 4B, the first computing unit computes vertex points $A_0$-$A_7$ to tessellate Bezier curve segment 42A into seven line segments 44A-44G that connect each of the vertex points with neighboring vertex points.

As described above in FIGS. 3A-3D, rendering line segments 44 without any further tessellation may result in a poor image quality for at least some portions of Bezier curve 42A, especially between vertex point $A_5$ and $A_7$. Therefore, a second computing device performs a second tessellation stage to tessellate Bezier curve segment 42A into additional line segments. Tessellation of Bezier curve segment 42A into additional line segments will be described with respect to tessellation of a portion of the Bezier curve segment 42A represented by line segment 44A for example purposes. However, the second computing device may tessellate the portions of Bezier curve segment 42A represented by line segments 44B-44G in a similar fashion in full parallel.

Prior to performing the second tessellation stage, vertex shader 30 or some other component of GPU 10 or CPU 6 transforms Bezier curve segment 42A from an object coordinate space to a device coordinate space to generate the mathematical representations defined in equations (10) and (11) above. After transformation into the device coordinate space, a second computing unit performs a second tessellation stage to tessellate the portion of Bezier curve segment 42A represented by line segment 44A (i.e., the portion of Bezier curve segment 42A from $A_0$ to $A_1$) into additional line segments.

Figure 4C:
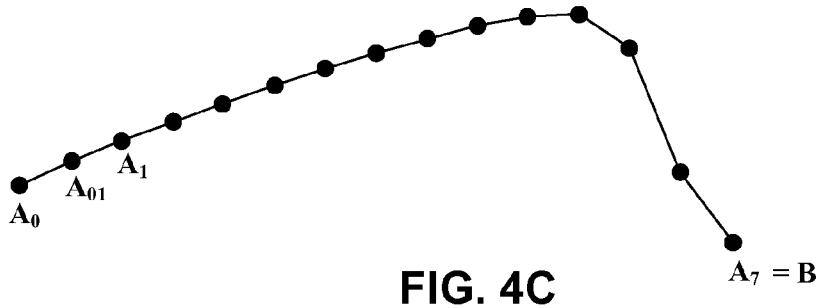

In the case of a vertex shader 30, for example, vertex shader 30 may be configured to input vertex attributes that actually define a line segment instead of a single vertex of the line segment. For example, vertex shader 30 may be configured to input vertex attributes that include a start vertex attribute (e.g., $A_0$) and an end vertex attribute (e.g., $A_1$) of the line segment that represent the vertex at which the line segment begins and ends, respectively. Vertex shader 30 may compute at least one additional vertex between vertex $A_0$ and $A_1$. As described above, the number of vertex attributes that can be used to define each vertex may be limited to a particular maximum number of attributes. Therefore, vertex shader 30 may only be able to compute a limited number of additional vertex points in a single pass. FIG. 4C illustrates Bezier curve segment 42A after the second tessellation stage. In the example illustrated in FIG. 4C, vertex shader 30 may only be able to compute one additional vertex attribute representing a new vertex point $A_{01}$. Therefore, vertex shader 30 may only tessellate the portion of Bezier curve 42A into one additional set of line segments. In other instances, however, vertex shader 30 may compute more than one additional vertex attribute per pass.

Figure 4D:
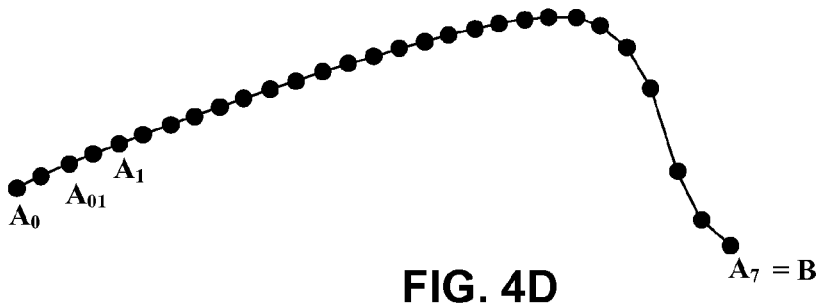

In some cases, the maximum number of available vertex attributes may be sufficient to fully tessellate the portion of Bezier curve segment 42A. If the maximum number of available vertex attributes is not sufficient, however, vertex shader 30 may compute more additional line segments recursively, i.e., by performing a third tessellation stage. In other words, vertex shader 30 may perform more than one tessellation stage recursively, i.e., a second tessellation stage followed by a third tessellation stage. For example, after the second tessellation stage, vertex shader 30 may input a new set of vertex attributes that include a start vertex attribute $A_0$ and an end vertex attribute $A_{01}$ that represent the line segment generated during the second tessellation stage. Vertex shader 30 computes at least one additional vertex between vertex $A_0$ and $A_{01}$ during the third tessellation stage. FIG. 4D illustrates Bezier curve segment 42A after the third tessellation stage by vertex shader 30. In the example illustrated in FIG. 4D, vertex shader 30 has now tessellated the portion of Bezier curve 42A between $A_0$ and $A_1$ into four line segments instead of one line segment. In this manner, vertex shader 30 may recursively tessellate the portion of the curve into additional line segments that provide a better representation of curve 42A, particularly between vertex point $A_5$ and $A_7$. Although in the example described above vertex shader 30 performs the second and third tessellation stages, other computing units of GPU 10 may perform the second and the third tessellation stage. For example, the second and third tessellation stages may be performed by any combination of vertex shader 30, geometry shader 32, pixel shader 36 and tessellation hardware 38.

Figure 5:
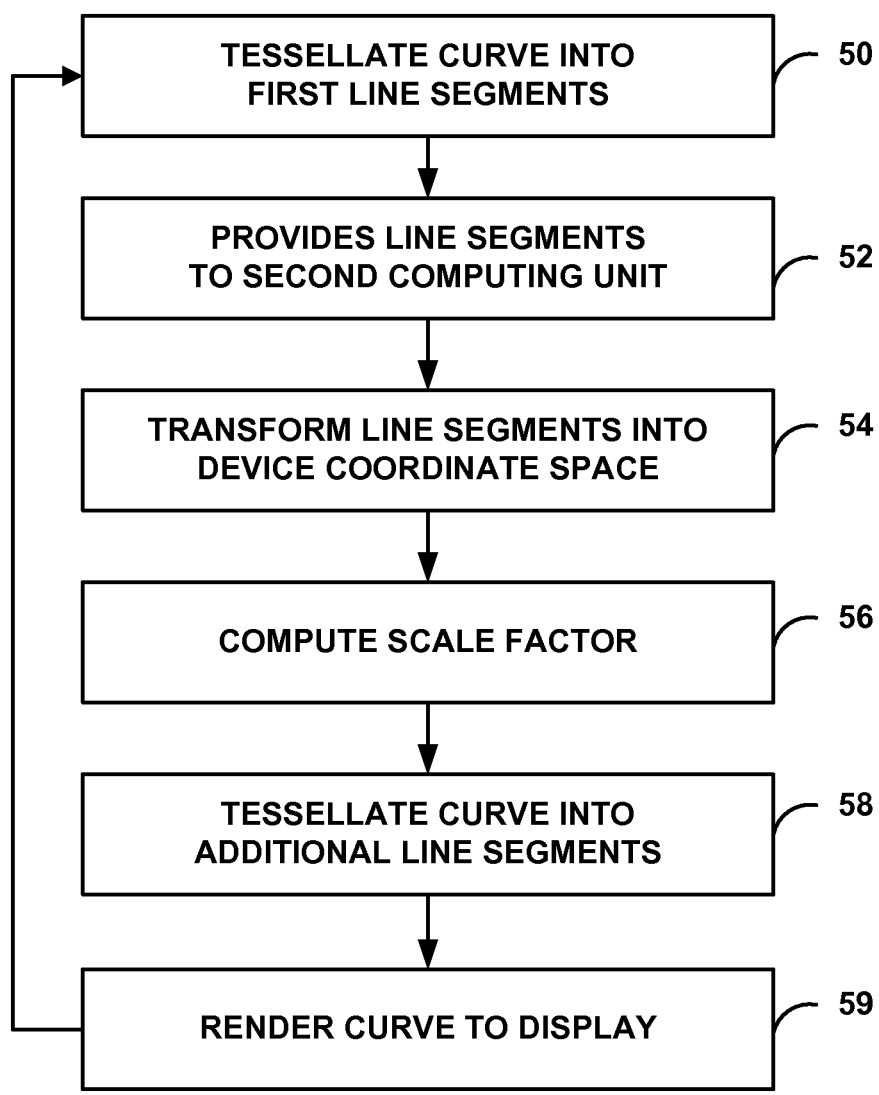
FIG. 5 is a flow diagram illustrating example operation of a computing device tessellating a curve in accordance with the multi-stage tessellation techniques described in this disclosure.

FIG. 5 is a flow diagram illustrating example operation of a computing device tessellating a curve in accordance with the multi-stage tessellation techniques described in this disclosure. A first computing unit of computing device 2 tessellates a curve into first line segments (50). To generate the first set of line segments, the first computing unit computes one or more vertex points that lie on the curve. The first computing unit may, for example, generate the one or more vertex points using a mathematical representation of the curve, e.g., a polynomial representation of the curve. The first line segments connect each of the vertex points to neighboring vertex points. Each of the line segments represents a portion of the curve. In one example, the first computing unit may be tessellation module 22 of CPU 6. In this case, tessellation load controller 24 may control the amount of tessellation performed by tessellation module 22 based on a processing load on CPU 6 and/or a processing load on GPU 10. In another example, the first computing unit may be one of the components of GPU 10, e.g., one of shader 30, 32 or 36 or tessellation hardware 38.

The first computing unit provides the line segments to a second computing unit (52). When the first computing unit is tessellation module 22, for example, tessellation module 22 may generate a list of drawing primitives using the vertex points of the line segments and provide the drawing primitives to GPU 10 via graphics API 26 and GPU driver 21. Tessellation module 22 may generate any of a number of drawing primitives including points, line strips, line loops, separate lines, triangle strips, triangle fans, separate triangles, quadrilateral strips, separate quadrilaterals, or other types of polygons.

The first or second computing unit transforms the curve from an object coordinate space to a device coordinate space (54). For example, vertex shader 30 of GPU 10 may transform the curve into the device coordinate space using equation (3) above. The transformation may be computed once per curve. In other words, the transformation may be computed at each of the points used to define the curve instead of computing the transformation for every vertex point through the path. The first or second computing unit computes a scale factor that represents the amount of scaling performed in the transformation (56). The scale factor may be computed based on the scaling variables used in the transformation, e.g., Scale_x and Scale_y of equation (3).

The second computing unit performs a second tessellation stage to tessellate the portions of the curve into additional line segments (58). The second computing unit may, for example, be one of the components of GPU 10. Thus, GPU 10 computes additional vertex points between each of the vertex points of each line segment computed by the first computing unit. The additional vertex points may be computed using a mathematical representation of the curve in the device coordinate space, e.g., after transformation. GPU 10 therefore represents each of the portions of the curve represented by the line segments produced by the first computing unit with a plurality of line segments instead of the single line segment generated by the first computing unit. In this manner, the second tessellation stage performed by GPU 10 produces additional line segments of the curve to more accurately represent the curve. In some instances, the number of additional line segments generated for the portions of the curve may be a function of the scale factor such that as the scale factor increases more additional line segments are computed to preserve more detail.

GPU 10 may perform the second tessellation stage using one or more shaders (e.g., vertex shader 30, geometry shader 32 or pixel shader 36). The shaders of GPU 10 may tessellate more than one portion of the curve in parallel. Thus, GPU 10 performs the second tessellation stage on multiple portions of the curve simultaneously. Doing so results in GPU acceleration of the tessellation of the curve, thereby improving the rendering performance. In other instances, tessellation hardware 38 within GPU 10 may perform the second tessellation stage. In other instances, tessellation hardware external to GPU 10 may perform the second tessellation stage, e.g., tessellation hardware 72 of FIG. 7. After performing the second tessellation stage, GPU 10 renders the curve to the display using the tessellated line segments (59). Although the flow diagram of FIG. 5 is described as a two-stage tessellation the techniques may be expanded to include more than two tessellation stages.

Figure 6:
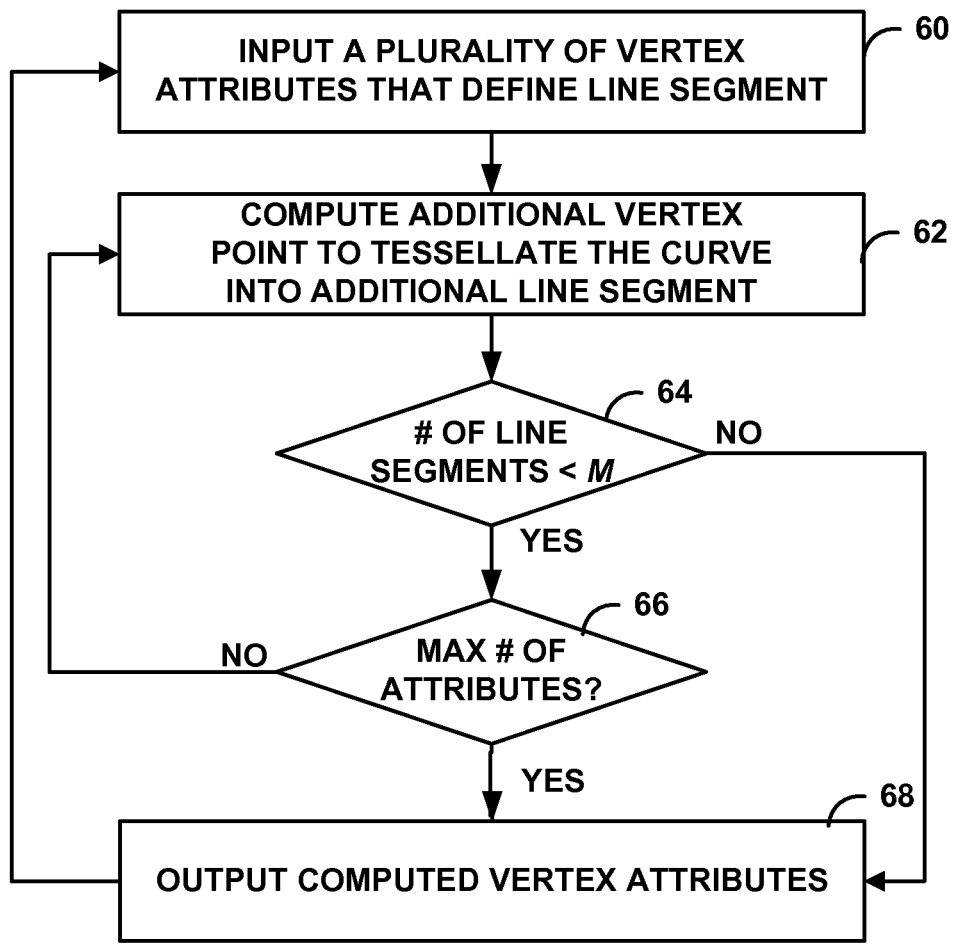
FIG. 6 is a flow diagram illustrating example operation of a vertex shader performing tessellation.

FIG. 6 is a flow diagram illustrating example operation of a shader, such as vertex shader 30 of FIG. 2, performing tessellation. Similar techniques may be utilized by a pixel shader 36 to tessellate the curve into additional line segments. Vertex shader 30 inputs a plurality of vertex attributes that define a line segment (60). For example, vertex shader 30 may input vertex attributes that include a start vertex attribute (e.g., $A_0$) that represents positional coordinates of a vertex point at which the line segment begins and an end vertex attribute (e.g., $A_1$) that represents positional coordinates of a vertex point at which the line segment that represent the vertex ends. In this manner, the vertex attributes input by vertex shader 30 represent a line segment instead of a single vertex point.

Vertex shader 30 computes coordinates of an additional vertex point between vertex $A_0$ and $A_1$ to tessellate the curve into an additional line segment (62). Vertex shader 30 may compute the additional vertex point as another vertex attribute. Vertex shader 30 may compute the coordinates of the additional vertex point between vertex point $A_0$ and $A_1$ using a mathematical representation of the curve in the device coordinate space, e.g., after transformation. Vertex shader 30 determines whether vertex shader 30 has tessellated the portion of the curve into the desired number of additional line segments M (64).

If the desired number of line segments generated by vertex shader 30 during the first pass is less than M, vertex shader 30 determines whether a maximum number of vertex attributes has been reached (66). As described above, the number of vertex attributes may be limited to a particular maximum number of vertex attributes. Therefore, vertex shader 30 may only be able to compute a limited number of additional vertex points in a single pass.

If the maximum number of vertex attributes has not been reached, vertex shader 30 computes another coordinate of an additional vertex point (62). If the maximum number of vertex attributes has been reached, however, vertex shader 30 outputs the computed vertex attributes (68). Vertex shader 30 may input a new set of vertex attributes that represents one of the additional line segments generated during the first pass (60). In other words, the maximum number of available vertex attributes was not sufficient to generate enough additional vertex points to fully tessellate the portion of curve. Vertex shader 30 may therefore computes more additional line segments recursively, i.e., by performing more than one tessellation stage.

If the desired number of line segments generated during the first pass is greater than or equal to M, vertex shader 30 outputs the computed vertex attributes (68). In other words, the maximum number of available vertex attributes was sufficient to generate enough additional vertex points to fully tessellate the portion of curve. Vertex shader 30 then inputs a plurality of vertex attributes that represents another line segment generated by CPU 6 (60).

FIG. 7 is a block diagram illustrating another example computing device 70 that performs tessellation in accordance with the techniques described in this disclosure. Computing device 70 of FIG. 7 is substantially similar to computing device 2 of FIG. 1, except that computing device 70 of FIG. 7 does not include GPU 10. Instead, computing device 70 includes dedicated tessellation hardware circuitry 72 that performs the second tessellation stage as described in detail below. The graphics rendering functions may be performed by CPU 6 instead of GPU 10.

To render a curve to display 16, CPU 6 performs a first tessellation stage to divide the curve into a first set of line segments that each represents a portion of the curve as described in detail above. In particular, CPU 6 computes vertex points along the curve that define the line segments. CPU 6 may compute the vertex points using equations associated with the type of curve, e.g., using equations (1) and (2) in the case of an elliptical arc curve, equations (6) and (7) in the case of a cubic Bezier curve, or equations (10) and (11) in the case of a quadratic Bezier curve. The amount of tessellation performed by CPU 6 during the first tessellation stage may vary as a function of a processing load on CPU 6. CPU 6 may include all features of CPU 6 illustrated in FIG. 2.

During a second tessellation stage, tessellation hardware circuitry 72 tessellates the portion of the curve represented by each of the line segments into additional line segments that more finely represent the shape of the curve. Tessellation hardware circuitry 72 may, for example, include one or more multiply and accumulation (MAC) operation units to perform the second tessellation stage. In one instance, tessellation hardware circuitry 72 may be formed of a pipelined array of MAC operation units that are configurable to compute polynomials of different degrees as described in detail below. In this case, tessellation hardware circuitry 72 inputs polynomial coefficients and at least one location along the curve at which to generate vertex points from CPU 6. The locations along the curve at which to generate vertex points may, for example, be a value of t in the case of Bezier curves or a value of $\theta$ in the case of elliptical arc curves. The MAC operation units of tessellation hardware circuitry 72 operate on the polynomial coefficients to generate one or more coordinates of vertex points at the particular locations.

CPU 6 may compute an expanded polynomial representation of the curve to determine the polynomial coefficients to load into tessellation hardware circuitry 72. In other words, CPU 6 may represent the curve as expanded polynomial p(x):

$$p(x) = \Sigma(K_i * x^i), \quad (12)$$

where $K_i$ is the polynomial coefficient of the $i^{th}$ degree term of the polynomial, x is a variable, i=0, 1, ..., n−1, n, and n is the degree of the polynomial. CPU 6 may compute the expanded polynomial representation of the curve using polynomial expansion. For example, CPU 6 may perform polynomial expansion on equations (10) and (11) to compute an expanded polynomial representation of a quadratic Bezier curve as:

$$p_x(t) = P_{2x} * t^2 + P_{1x} * t + P_{0x} \quad (13)$$

$$p_y(t) = P_{2y} * t^2 + P_{1y} * t + P_{0y} \quad (14)$$

where $P_{2x}$, $P_{1x}$, $P_{0x}$, $P_{2y}$, $P_{1y}$, and $P_{0y}$ are polynomial coefficients defined as $P_{2x}=(x_s-2*x_c+x_e)$, $P_{1x}=2*(x_c-x_s)$, $P_{0x}=x_s$, $P_{2y}=(y_s-2*y_c+y_e)$, $P_{1y}=2*(y_c-y_s)$ and $P_{0y}=y_s$. In other instances, CPU 6 may compute the polynomial representation using any of a number of polynomial approximation algorithms. In the case of an elliptical arc curve defined using equations (1) and (2), CPU 6 may compute a polynomial representation using Taylor expansion, least squares approximation or another approximation technique. For example, CPU 6 may compute an expanded polynomial representation for the elliptical arc curve by approximating $\sin(\theta)$ with the polynomial $S_2*\theta^2+S_1*\theta+S_0$ and $\cos(\theta)$ with the polynomial $C_2*\theta^2+C_1*\theta+C_0$, where $S_2$, $S_1$, $S_0$, $C_2$, $C_1$ and $C_0$ are polynomial coefficients computed using the particular approximation technique.

In addition, CPU 6 may transform the curve from the object coordinate space to the device coordinate space in accordance with equation (3) above. CPU 6 may transform the curve from the object coordinate space to the device coordinate space either prior to computing the polynomial representation of the curve or after computing the polynomial representation of the curve. As described above, CPU 6 may compute the transformation once per curve. In other words, CPU 6 may compute the transformation at each of the points used to define the curve instead of computing the transformation for every vertex point along the curve. In the case of a quadratic Bezier curve, for example, CPU 6 may compute the transformation of the start point $(x_s, y_s)$, end point $(x_e, y_e)$ and control point $(x_c, y_c)$ instead of computing the transformation for each of the computed vertex points of the first set of line segments. In other instances, tessellation hardware circuitry 72 or some other component of computing device 70 may perform the transformation.

During the transformation, CPU 6 may determine a scale factor that approximates the amount of scaling performed during the transformation. In some instances, the degree of tessellation that occurs during the second tessellation stage may be a function of the scale factor. For example, CPU 6 may compute the number of additional line segments to tessellate each portion of the curve into based on the scale factor. After CPU 6 computes the number of additional line segments to tessellate each portion of the curve into, CPU 6 determines locations along the portion of the curve at which to generate a new vertex point. For a portion of an elliptical curve from $\theta_0=0$ to $\theta_1=\pi/4$ that is to be divided into four additional line segments, for example, CPU 6 may determine that new vertices need to be computed at locations $\theta_{01}=\pi/16$, $\theta_{02}=\pi/8$, $\theta_{03}=3\pi/16$ to equally divide the portion of the curve from $\theta_0=0$ to $\theta_1=\pi/4$ into four additional line segments.

CPU 6 provides tessellation hardware circuitry 72 with the polynomial coefficients for the expanded polynomial representation of the curve and one or more locations on the curve at which to generate coordinates of vertex points. In the elliptical arc curve example described above, the locations on the curve at which to generate coordinates of new vertex points are the values of $\theta_{01}$, $\theta_{02}$, and $\theta_{03}$ or a decimal approximation of those values. CPU 6 may directly load the computed polynomial coefficients and the locations into tessellation hardware circuitry 72 or program a pointer into tessellation hardware circuitry 72, in which case tessellation hardware circuitry 72 loads the polynomial coefficients and the locations. In either case, the polynomial coefficients and locations are dynamically loaded into tessellation hardware circuitry 72 based on the type of curve that is being tessellated.

As will be described in detail below, tessellation hardware circuitry 72 computes the coordinates of the vertex points at the specified locations using the polynomial coefficients and the locations specified by CPU 6. In this manner, computing device 70 may utilize tessellation hardware circuitry 72 to offload a portion of the tessellation workload from CPU 6 to tessellation hardware circuitry 72. In some instances, tessellation hardware circuitry 72 may perform all of the tessellation, e.g., when CPU 6 is experiencing high processing load. Tessellation hardware circuitry 72 may output the coordinates of the vertex points to CPU 6, which may perform additional graphics rendering operations for presentation of the curve on display 16. Alternatively, CPU 6 or tessellation hardware circuitry 72 may store the new vertex points in device memory 8 for later processing. In instances in which tessellation hardware circuitry 72 is within GPU 10, such as illustrated in FIG. 2, tessellation hardware circuitry 72 may output the coordinates of the vertex points to other components, such as vertex shader 30, geometry shader 32 or pixel shader 36 of GPU 10.

A number of other elements may also be included in computing device 70, but are not specifically illustrated in FIG. 7 for simplicity and ease of illustration. For example, computing device 70 may include a GPU, such as GPU 10 of FIG. 1, coupled to the other components via bus 18. Moreover, the architecture illustrated in FIG. 7 is merely exemplary, as the techniques described in this disclosure may be implemented with a variety of other architectures.

Figure 8:
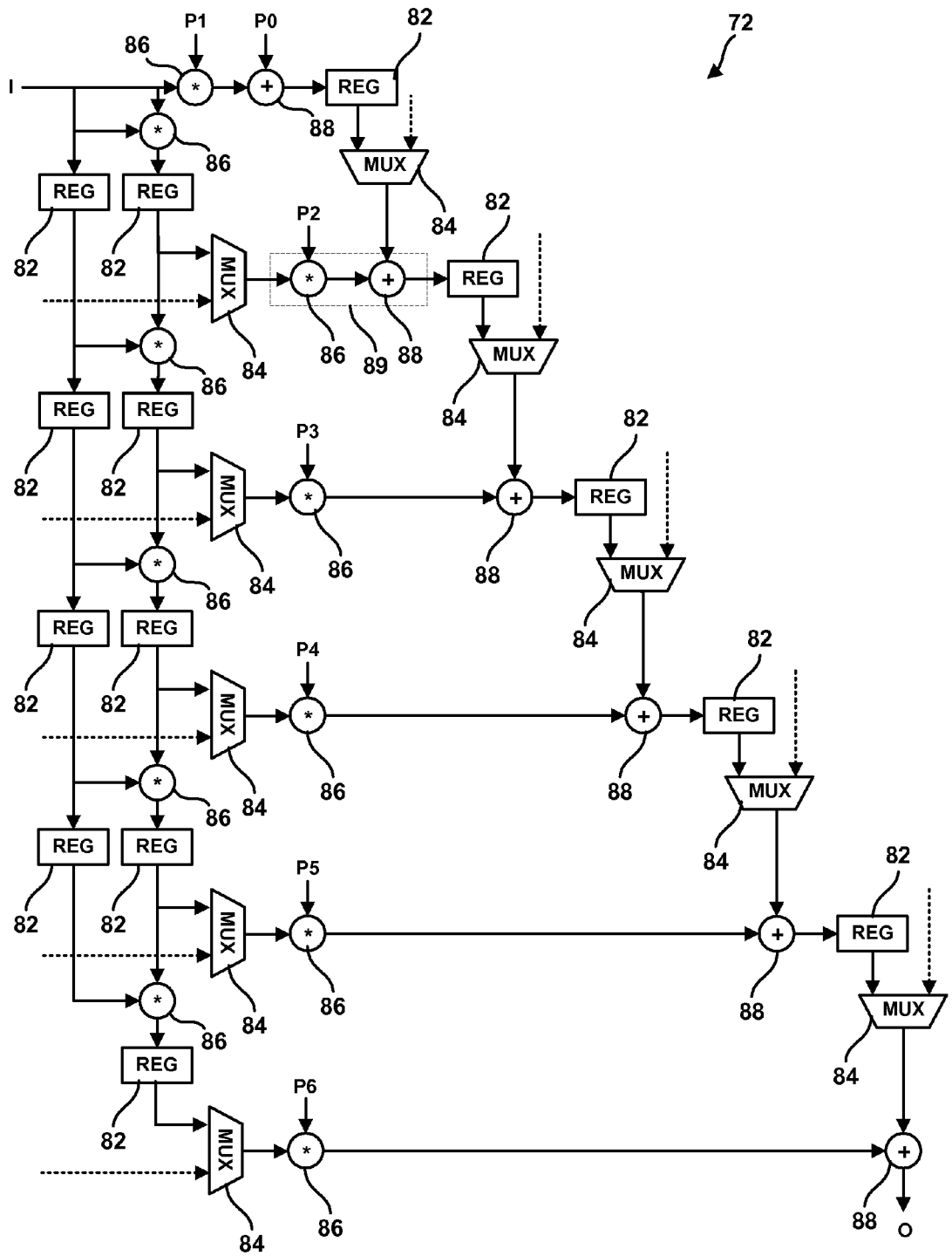
FIG. 8 is a schematic diagram illustrating example tessellation hardware circuitry that performs tessellation in accordance with the techniques described in this disclosure.

FIG. 8 is a schematic diagram illustrating example tessellation hardware circuitry 72 that performs tessellation in accordance with the techniques described in this disclosure. Tessellation hardware circuitry 72 includes a plurality of registers 82 (labeled "REG" in FIG. 8), a plurality of multiplexers 84 (labeled "MUX" in FIG. 8), a plurality of multiplication operation units 86 and a plurality of accumulation operation units 88. A multiplication operation unit 86 followed by an accumulation operation unit 88 makes up a MAC operation unit, illustrated by dotted line 89. Tessellation hardware circuitry 72 comprises a configurable MAC array arranged in a pipeline. Thus, the output of each MAC operation unit is an input to a subsequent MAC operation unit, except for the output of the last MAC operation unit which is the generated vertex coordinate.

MUXs 84 provide tessellation hardware circuitry 72 with configurability. In particular, MUXs 84 may be configured to output one of two inputs. The input represented by the solid line to each of the MUXs 84 corresponds to the input that MUXs 84 will pass through. In other words, the value of each of the inputs that is shown in a solid line is the value that each of the MUXs 84 will respectively output. The input represented as the dotted line to each of the MUXs 84 corresponds to the input that the MUXs 84 will not pass through. Tessellation hardware circuitry 72 may therefore be configured by changing the MUX inputs that will be passed through by MUXs 84, as described in more detail with respect to FIGS. 9 and 10.

Tessellation hardware circuitry 72 illustrated in FIG. 8 is a six-stage configurable MAC array that may be configured to compute up to a sixth degree polynomial. Tessellation hardware circuitry 72 may be configured into multiple shorter pipelines that compute polynomials of smaller degrees. For example, the six-stage configurable MAC array illustrated in FIG. 8 may be configured to operate as two parallel three-stage MAC arrays (FIG. 9) that each computes a third degree polynomial, three parallel two-stage MAC arrays (FIG. 10) that each computes a second degree polynomial or the like. In this manner, tessellation hardware circuitry 72 may be configured to provide hardware acceleration during the tessellation process, thus resulting in improved rendering performance. Although illustrated as a six-stage configurable MAC array, tessellation hardware circuitry 72 may include more or fewer configurable pipelined MAC stages.

Tessellation hardware circuitry 72 may be dynamically re-configured in run time based on the type of curve being tessellated. For example, when tessellating a quadratic Bezier curve or an elliptical arc curve, which are represented as second degree polynomials, CPU 6 may configure tessellation hardware circuitry 72 to operate as three parallel two-stage MAC arrays. When tessellating a cubic Bezier curve, which is represented as a third degree polynomial, CPU 6 may configure tessellation hardware circuitry 72 to operate as two parallel three-stage MAC arrays.

Tessellation hardware circuitry 72 receives from CPU 6 polynomial coefficients P0-P6 for use in computing vertex points. The polynomial coefficients may be either polynomial coefficients for computing an x-coordinate of the vertex point or the polynomial coefficients for computing a y-coordinate of the vertex point. In instances in which tessellation hardware circuitry 72 operates as more than one multi-stage MAC array, the polynomial coefficients may polynomial coefficients for computing the x-coordinates and the y-coordinates of the vertex point. As described above, CPU 6 computes the polynomial coefficients P0-P6 and provides the computed polynomial coefficients P0-P6 to tessellation hardware circuitry 72. CPU 6 may directly load the computed polynomial coefficients P0-P6 into tessellation hardware circuitry 72 or program a pointer into tessellation hardware circuitry 72, in which case tessellation hardware circuitry 72 loads the polynomial coefficients P0-P6. In either case, the polynomial coefficients P0-P6 are dynamically loaded based on the type of curve that is being tessellated.

Moreover, CPU 6 provides tessellation hardware circuitry 72 with an input (I) that corresponds with a location along the curve at which a vertex point is to be generated. In the case of an elliptical arc curve defined using OpenVG, the input may be a particular value of θ. In the case of a Bezier curve defined using OpenVG, the input may be a particular value of t. Tessellation hardware circuitry 72 performs the various multiplication and accumulation operations on the input using the polynomial coefficients P0-P6 to compute an output (O). The output represents a coordinate (e.g., an x-coordinate or y-coordinate) of a vertex point at the location along the curve identified by the input. Tessellation hardware circuitry 72 outputs a sixth degree polynomial of the form:

$$O = P6*I^6 + P5*I^5 + P4*I^4 + P3*I^3 + P2*I^2 + P1*I + P0. \qquad (15)$$

Tessellation hardware circuitry continues to receive input locations along the curve and polynomial coefficients until tessellation hardware circuitry 72 computes vertex points of the desired number of line segments are generated. For a portion of an elliptical curve from $\theta_0=0$ to $\theta_1=\pi/4$ that is to be divided into four additional line segments, for example, CPU 6 may provide tessellation hardware circuitry 72 with inputs $\theta_{01}=\pi/16$, $\theta_{02}=\pi/8$, $\theta_{03}=3\pi/16$ to generate vertex points for equally dividing the portion of the curve from $\theta_0=0$ to $\theta_1=\pi/4$ into four additional line segments.

Figure 9:
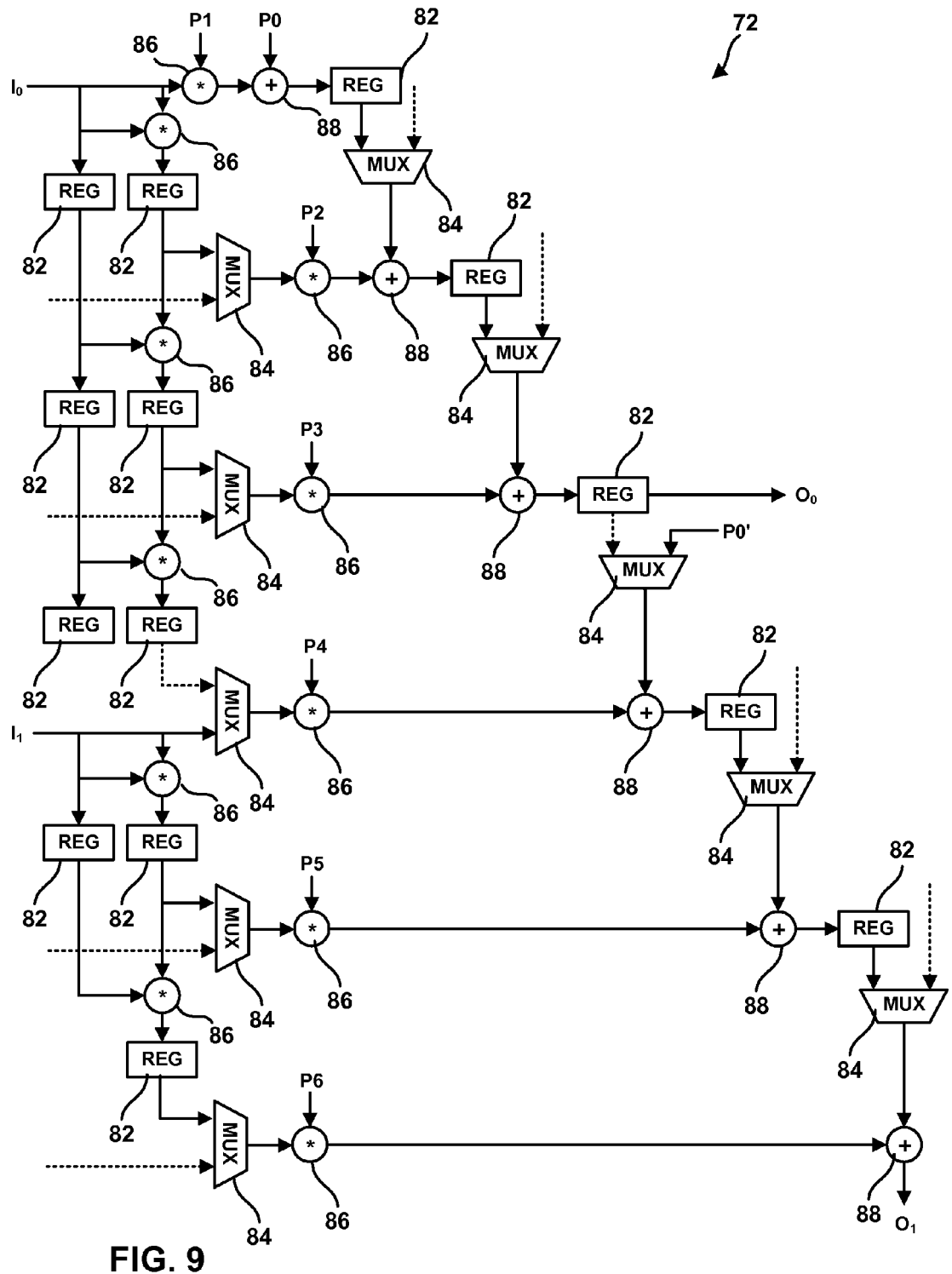
FIG. 9 is a schematic diagram illustrating tessellation hardware circuitry configured to operate as two parallel three-stage multiply and accumulation (MAC) arrays that each computes a third degree polynomial.

FIG. 9 is a schematic diagram illustrating tessellation hardware circuitry 72 configured to operate as two parallel three-stage MAC arrays that each computes a third degree polynomial. In particular, the first three MAC operation units operate as a first three-stage MAC array that outputs a first, third degree polynomial of the form:

$$O_0 = P3*I_0^3 + P2*I_0^2 + P1*I_0 + P0. \qquad (16)$$

The last three MAC operation units operate as a second three-stage MAC array that outputs a second, third degree polynomial of the form:

$$O_1 = P6*I_1^3 + P5*I_1^2 + P4*I_1 + P0'. \qquad (17)$$

Tessellation hardware circuitry 72 computes two coordinates using inputs $I_0$ and $I_1$ and polynomial coefficients P0, P0', P1, P2, P3, P4, P5 and P6. In one instances, tessellation hardware circuitry 72 may compute two coordinates that define a vertex point at location I. In other words, tessellation hardware circuitry 72 may compute an x-coordinate and a y-coordinate (i.e., (x, y)) that define the vertex point at location I. In this case inputs $I_0$ and $I_1$ are equal, and polynomial coefficients P0, P1, P2 and P3 correspond with polynomial coefficients of a polynomial for computing the x-coordinate and polynomial coefficients P0', P4, P5 and P6 correspond with polynomial coefficients of a polynomial for computing the y-coordinate.

In other instances, tessellation hardware circuitry 72 may compute two coordinates corresponding with different vertex points. For example, tessellation hardware circuitry 72 may compute two x-coordinates that represent the x-coordinates of two vertex points at different locations $I_0$ and $I_1$ along the curve. In this case $I_0$ and $I_1$ are not equal, and polynomial coefficients P0, P1, P2, and P3 and polynomial coefficients P0', P4, P5, and P6 both correspond with polynomial coefficients of a polynomial for computing the x-coordinate. After computing the x-coordinates for the vertex points, tessellation hardware 72 inputs coefficients associated with the y-coordinates of the vertex points and compute y-coordinates for the vertex points of the various locations I along the curve. In either case, tessellation hardware circuitry 72 provides hardware acceleration during the tessellation process by outputting two coordinate values for the vertex points in a single pass.

Figure 10:
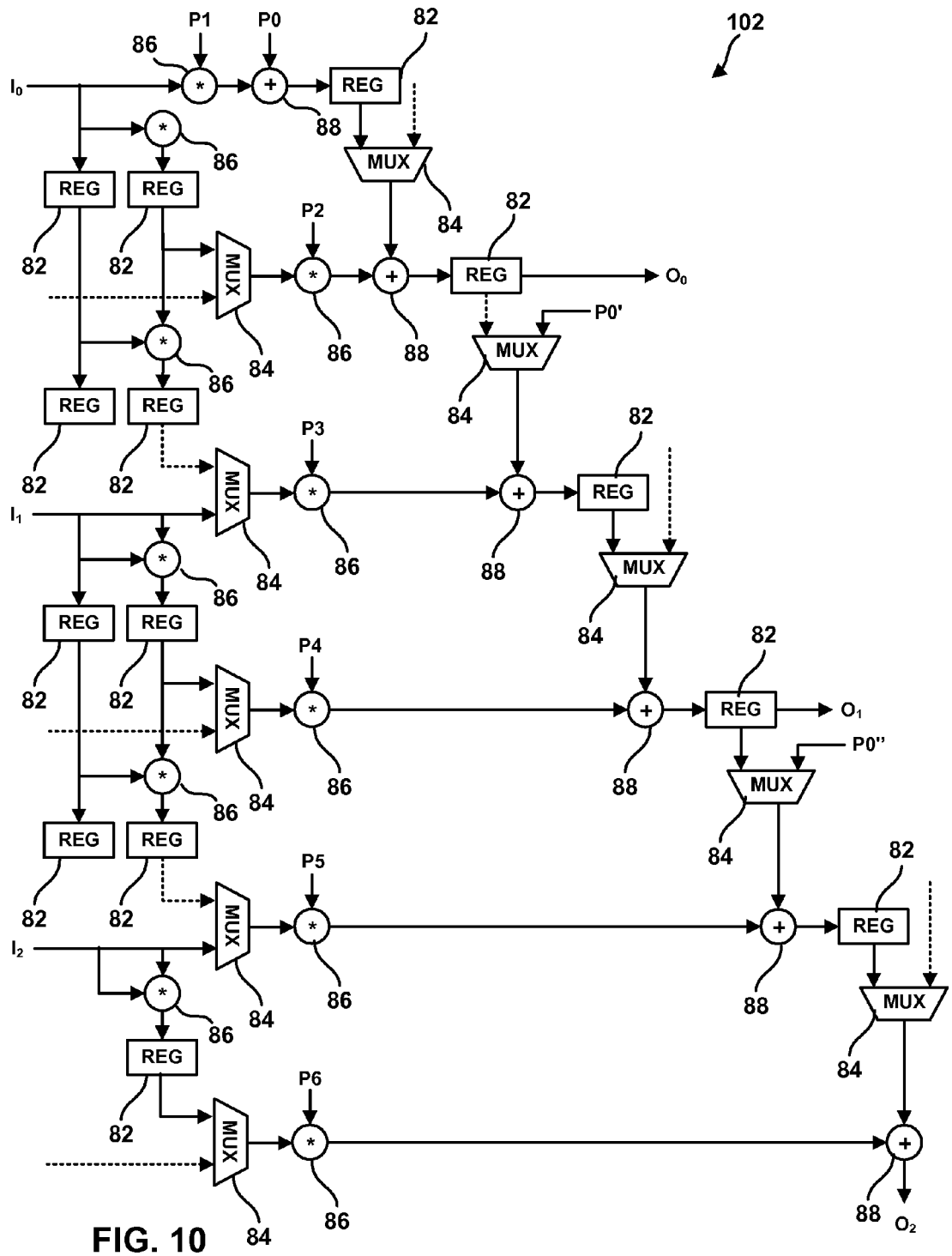
FIG. 10 is a schematic diagram illustrating tessellation hardware circuitry configured to operate as three parallel two-stage MAC arrays that each computes a second degree polynomial.

FIG. 10 is a schematic diagram illustrating tessellation hardware circuitry 72 configured to operate as three parallel two-stage MAC arrays that each computes a second degree polynomial. In particular, the first pair of MAC operation units operate as a first two-stage MAC array that outputs a first, second degree polynomial of the form:

$$O_0 = P2 * I_0^2 + P1 * I_0 + P0. \qquad (18)$$

The second pair of MAC operation units operate as a second two-stage MAC array that outputs a second, second degree polynomial of the form:

$$O_1 = P3 * I_1^2 + P4 * I_1 + P0'. \qquad (19)$$

The last pair of MAC operation units operate as a second three-stage MAC array that outputs a third, second degree polynomial of the form:

$$O_2 = P6 * I_2^2 + P5 * I_2 + P0''. \qquad (20)$$

Tessellation hardware circuitry 72 computes three coordinates using inputs $I_0$, $I_1$ and $I_2$, and polynomial coefficients P0, P0', P0'', P1, P2, P3, P4, P5 and P6. As described above, tessellation hardware circuitry 72 may compute three coordinates corresponding with different vertex points. For example, tessellation hardware circuitry 72 may compute three x-coordinates that represent the x-coordinates of three vertex points at different locations $I_0$, $I_1$ and $I_2$ along the curve. In this case $I_0$, $I_1$ and $I_2$ are not equal, and polynomial coefficients P0, P1, P2, polynomial coefficients P0', P3, and P4, and polynomial coefficients P0'', P5, and P6 each correspond with polynomial coefficients of a second degree polynomial for computing the x-coordinate. After computing the x-coordinates for the vertex points, tessellation hardware 72 inputs coefficients associated with the y-coordinates of the vertex points and compute y-coordinates for the vertex points at $I_0$, $I_1$ and $I_2$ along the curve.

Alternatively, tessellation hardware circuitry 72 may compute a combination of both x-coordinates and y-coordinates of vertex points along the curve. In other words, tessellation hardware circuitry 72 may compute two x-coordinates and a y-coordinate or two y-coordinates and an x-coordinate at various locations I along the curve. In this case inputs $I_0$ and $I_1$ are equal, and polynomial coefficients P0, P1, and P2 correspond with polynomial coefficients of a polynomial for computing the x-coordinate and polynomial coefficients P0', P3, and P4 correspond with polynomial coefficients of a polynomial for computing the y-coordinate. $I_2$ on the other hand is different than $I_0$ and $I_1$ and the polynomial coefficients P0'', P5 and P6 may be either polynomial coefficients for the x-coordinate or the y-coordinate. In either case, tessellation hardware circuitry 72 provides hardware acceleration during the tessellation process by outputting three coordinate values for the vertex points in a single pass.

Figure 11:
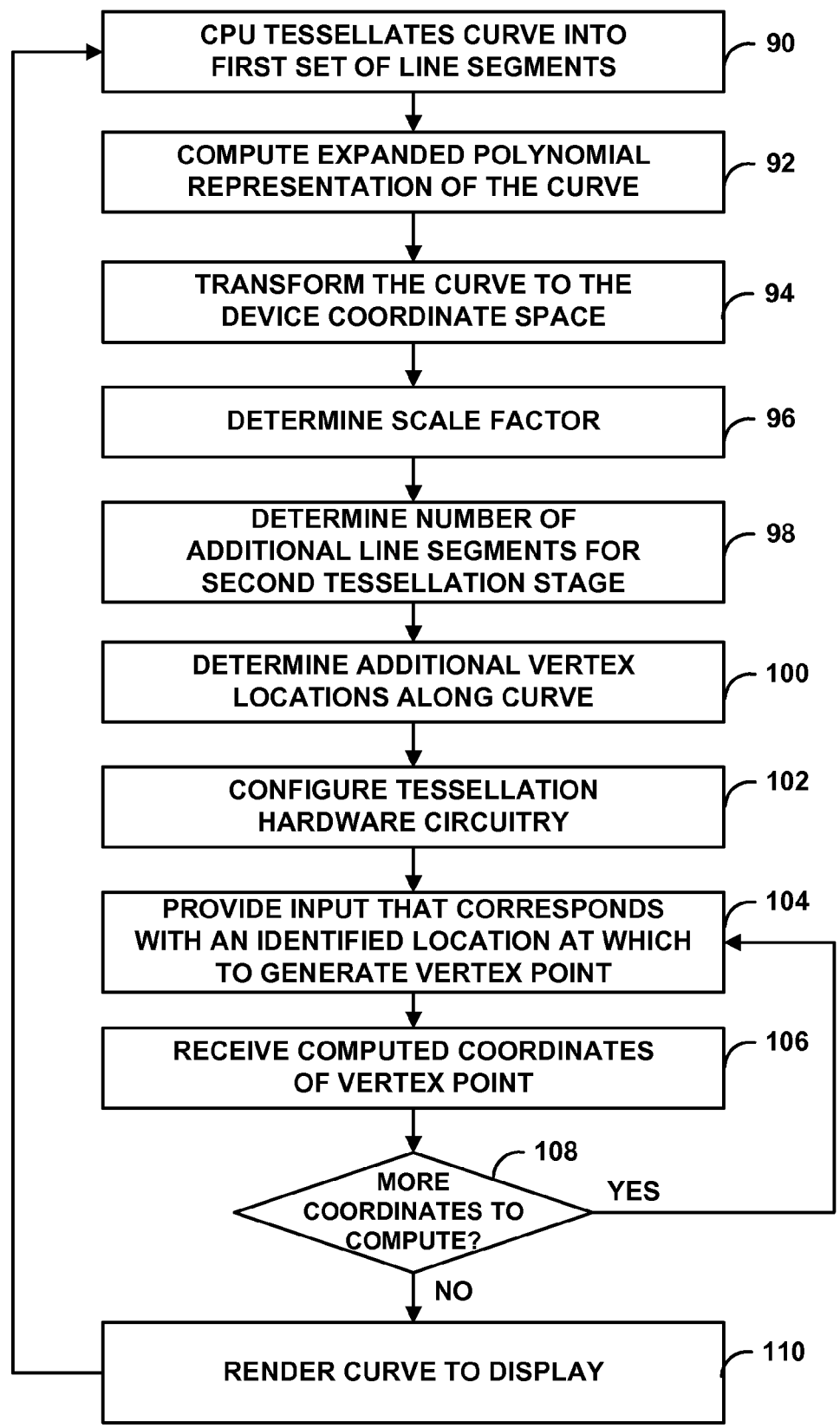
FIG. 11 is a flow diagram illustrating example operation of a computing device performing tessellation in accordance with the techniques described in this disclosure.

FIG. 11 is a flow diagram illustrating example operation of a computing device performing tessellation in accordance with the techniques described in this disclosure. Software application 20 invokes tessellation module 22 of CPU 6 to tessellate a curve into a first set of line segments (90). To generate the first set of line segments, tessellation module 22 computes one or more vertex points that lie on the curve. Tessellation module 22 may, for example, generate the one or more vertex points using a mathematical representation of the curve. Line segments connect each of the vertex points to neighboring vertex points. Each of the line segments represents a portion of the curve.

CPU 6 computes an expanded polynomial representation of the curve (92). CPU 6 may, for example, compute an expanded polynomial representation of an elliptical arc curve defined in accordance with equations (1) and (2) by approximating $\sin(\theta)$ with the polynomial $S_2 * \theta^2 + S_1 * \theta + S_0$ and $\cos(\theta)$ with the polynomial $C_2 * \theta^2 + C_1 * \theta + C_0$. The expanded polynomial representations are provided below.

$$p_x(\theta) = P_{2x} * \theta^2 + P_{1x} * \theta + P_{0x} \qquad (21)$$

$$p_y(\theta) = P_{2y} * \theta^2 + P_{1y} * \theta + P_{0y} \qquad (22)$$

where $P_{2x}$, $P_{1x}$, $P_{0x}$, $P_{2y}$, $P_{1y}$, and $P_{0y}$ are polynomial coefficients defined as $P_{2x} = -a * C2$, $P_{1x} = -a * C1$, $P_{0x} = -a * C0$, $P_{2y} = b * C2$, $P_{1y} = b * C1$ and $P_{0y} = b * C0$.

In addition, CPU 6 may transform the curve from the object coordinate space to the device coordinate space (94). CPU 6 may transform to the device coordinate space either prior to computing the polynomial representation of the curve or after computing the polynomial representation of the curve. As described above, CPU 6 may compute the transformation once per curve. In other words, CPU 6 may compute the transformation at each of the points used to define the curve instead of computing the transformation for every vertex point along the curve. In the case of a quadratic Bezier curve, for example, CPU 6 may compute the transformation of the start point start point $(x_s, y_s)$, end point $(x_e, y_e)$ and control point $(x_c, y_c)$ instead of computing the transformation for each of the computed vertex points of the first set of line segments. In other instances, tessellation hardware circuitry 72 or some other component of computing device 70 may perform the transformation.

During the transformation, CPU 6 may determine a scale factor that approximates the amount of scaling performed during the transformation (96). CPU 6 determines the number of additional line segments for the second tessellation stage based on the scale factor (98). In particular, CPU 6 may determine that the second tessellation stage subdivides the portion of the curve represented by the line segments into more additional line segments as the scale factor increases. After CPU 6 computes the number of additional line segments to tessellate each portion of the curve into, CPU 6 determines locations along the portion of the curve at which to generate a new vertex point (100). For a portion of an elliptical curve from $\theta_0 = 0$ to $\theta_1 = \pi/4$ that is to be divided into four additional line segments, for example, CPU 6 may determine that new vertices need to be computed at locations $\theta_{01}=\pi/16, \theta_{02}=\pi/8, \theta_{03}=3\pi/16$ to equally divide the portion of the curve from $\theta_0=0$ to $\theta_1=\pi/4$ into four additional line segments.

CPU 6 configures tessellation hardware circuitry 72 to tessellate the curve (102). CPU 6 may, for example, provide tessellation hardware circuitry 72 with the polynomial coefficients for the expanded polynomial representation of the curve. CPU 6 may directly load the computed polynomial coefficients or program a pointer into tessellation hardware circuitry 72, in which case tessellation hardware circuitry 72 loads the polynomial coefficients and the locations. In either case, the polynomial coefficients are dynamically loaded into tessellation hardware circuitry 72 based on the type of curve that is being tessellated, e.g., an elliptical arc curve, a quadratic Bezier curve, a cubic Bezier curve, or the like.

CPU 6 provides tessellation hardware circuitry 72 with one or more inputs that identify locations along the curve at which to generate coordinates of one or more vertex points (104). As described above, tessellation hardware circuitry 72 may be configured to operate as two parallel three-stage MAC arrays (FIG. 9) that each computes a coordinate of a vertex point or be configured to operate as three parallel two-stage MAC arrays (FIG. 10) that each computes a coordinate of a vertex point. Tessellation hardware circuitry may be configured to compute x-coordinates of more than one vertex point, y-coordinates of more than one vertex point, an x-coordinates and y-coordinate of the same vertex point, or a combination thereof.

CPU 6 receives the one or more coordinates computed by tessellation hardware 72 (106). CPU 6 determines whether there are more coordinates to compute for the vertex points (108). When there are more coordinates to compute for the vertex points, CPU 6 continues to configure tessellation hardware circuitry 102 and provide input for computing the additional coordinates. When there are no more coordinates to compute, CPU 6 renders the curve to the display using the tessellated line segments (110).

The techniques described herein may be implemented in hardware, software, firmware, or any combination thereof. Any features described as modules or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more DSPs, general purpose microprocessors, ASICs, field programmable logic arrays FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software applications or hardware modules configured for tessellating graphics images. Hence, the disclosure also contemplates any of a variety of integrated circuit devices that include circuitry to implement one or more of the techniques described in this disclosure. Such circuitry may be provided in a single integrated circuit chip or in multiple, interoperable integrated circuit chips.

Various aspects have been described. These and other aspects are within the scope of the following claims.

The invention claimed is:

1. A method comprising:
tessellating a curve, which is a graphical curve, to divide the curve into first line segments with a first computing unit;
receiving, with a second computing unit comprising dedicated tessellation hardware, a portion of the tessellated curve represented by one of the first line segments, wherein the first computing unit provides the tessellated curve to the second computing unit;
tessellating further the portion of the tessellated curve represented by the one of the first line segments into second line segments with the second computing unit,
wherein tessellating further the portion of the tessellated curve represented by the one of the first line segments into second line segments with the second computing unit further comprises;
receiving at least one input; and
generating at least one coordinate of at least one vertex point corresponding to one of the second line segments based on the at least one input.

2. The method of claim 1, further comprising:
transforming the curve from a first coordinate space to a second coordinate space, wherein tessellating the portion of the tessellated curve represented by one of the first line segments comprises tessellating the portion of the tessellated curve represented by one of the line segments into the second line segments with the second computing unit based on a scale factor used in transforming the tessellated curve.

3. The method of claim 2, wherein tessellating the portion of the tessellated curve represented by one of the first line segments into second line segments based on the scale factor comprises tessellating the portion of the tessellated curve represented by one of the first line segments into a larger number of second line segments when the scale factor increases.

4. The method of claim 1, further comprising dynamically balancing an amount of tessellation of the curve performed by the first computing unit based on at least a load of the first computing unit.

5. The method of claim 4, wherein dynamically balancing the amount of tessellation of the curve performed by the first computing unit based on a load of the first computing unit comprises tessellating the curve to divide the curve into fewer first line segments when the load of the first computing unit is above a threshold.

6. The method of claim 1, wherein the first computing unit comprises a central processing unit (CPU) and the second computing unit comprises a graphics processing unit (GPU), wherein tessellating, with the GPU, the tessellated portion of the curve represented by one of the first line segments comprises tessellating a first portion of the tessellated curve represented by a first of the first line segments, the method further comprising tessellating a second portion of the tessellated curve represented by a second of the first line segments in parallel.

7. The method of claim 6, wherein tessellating the each of the first and second portions of the tessellated curve represented by the first and second of the first line segments comprises tessellating the respective portion of the curve represented by the respective first line segment with a shader unit of the GPU.

8. The method of claim 7, wherein the shader comprises a vertex shader, the method further comprising:
receiving, with the vertex shader, a plurality of vertex attributes, the plurality of vertex attributes including at least two vertex attributes that specify vertex points of one of the first line segments; and
generating additional vertex attributes that represent additional points that lie on the portion of the tessellated curve represented by the one of the first line segments to tessellate the portion of the tessellated curve into the second line segments.

9. The method of claim 1, wherein the tessellation hardware includes a pipeline of a plurality of multiply and accumulation operation units, and generating at least one coordinate of the at least one vertex point comprises implementing a polynomial representation of the tessellated curve to generate at least one coordinate of the vertex point corresponding to the one of the second line segments based on the at least one input.

10. The method of claim 9, further comprising configuring the pipeline of the plurality of multiply and accumulation operation units such that the tessellation hardware operates as two or more parallel pipelines that each generate a coordinate of a vertex point.

11. The method of claim 1, wherein first computing unit is a first component of a graphics processing unit (GPU) and the second computing unit is a second component of the GPU.

12. The method of claim 1, further comprising rendering the second line segments to present the tessellated curve to a display.

13. The method of claim 1, further comprising tessellating a portion of the tessellated curve represented by one of the second line segments into third line segments with one of the first computing unit, the second computing unit and a third computing unit.

14. A device comprising:
a first computing unit that tessellates a curve to divide the curve into first line segments; and
a second computing unit comprising dedicated tessellation hardware that:
receives a portion of the tessellated curve represented by one of the first line segments, wherein the first computing unit provides the tessellated curve to the second computing;
tessellates further a portion of the tessellated curve represented by one of the first line segments into second line segments,
wherein to tessellate further the portion of the tessellated curve represented by the one of the first line segments into second line segments, the second computing unit:
receives at least one input; and
generates at least one coordinate of at least one vertex point corresponding to one of the second line segments based on the at least one input.

15. The device of claim 14, wherein one of the first and second computing units transforms the curve from a first coordinate space to a second coordinate space, and the second computing unit tessellates the portion of the tessellated curve represented by one of the first line segments into the second line segments based on a scale factor used in transforming the curve.

16. The device of claim 15, wherein the second computing unit tessellates the portion of the tessellated curve represented by the one of the first line segments into a larger number of second line segments when the scale factor increases.

17. The device of claim 14, wherein the first computing unit dynamically balances an amount of tessellation of the curve performed by the first computing unit based on at least a load of the first computing unit.

18. The device of claim 17, wherein the first computing unit tessellates the curve to divide the curve into a smaller number of first line segments when the load of the first computing unit is above a threshold.

19. The device of claim 14, wherein the first computing unit comprises a central processing unit (CPU) and the second computing unit comprises a graphics processing unit (GPU), wherein the GPU tessellates a first portion of the tessellated curve represented by a first of the first line segments and tessellates a second portion of the tessellated curve represented by a second of the first line segments in parallel.

20. The device of claim 19, wherein the GPU tessellates each of the first and second portions of the tessellated curve with a shader unit of the GPU.

21. The device of claim 20, wherein the shader unit comprises a vertex shader that receives a plurality of vertex attributes, the plurality of vertex attributes including at least two vertex attributes that specify vertex points of the one of the first line segment and generates additional vertex attributes that represent additional vertex points that lie on the portion of the tessellated curve represented by the one of the first line segments.

22. The device of claim 14, wherein the tessellation hardware comprises a plurality of multiply and accumulation operation units arranged in a pipeline configuration that implement a polynomial representation of the tessellated curve to generate at least one coordinate of the at least one vertex point corresponding to the one of the second line segments based on the at least one input.

23. The device of claim 22, wherein the pipeline of the plurality of multiply and accumulation operation units is configured such that the tessellation hardware operates as two or more parallel pipelines that each generate a coordinate of the at least one vertex point.

24. The device of claim 14, wherein first computing unit is a first component of a graphics processing unit (GPU) and the second computing unit is a second component of the GPU.

25. The device of claim 14, further comprising a display, wherein one of the first and second computing unit renders the second line segments to present the tessellated curve to the display.

26. The device of claim 14, wherein one of the first computing unit, the second computing unit and a third computing unit tessellates a portion of the tessellated curve represented by one of the second line segments into third line segments.

27. A device comprising:
first means for tessellating a curve to divide the curve into first line segments; and
second means for tessellating further a portion of the tessellated curve represented by one of the first line segments into second line segments, wherein the second means for tessellating comprises dedicated tessellation hardware,
wherein the second means for tessellating receives the portion of the tessellated curve represented by one of the first line segments, wherein the first means for tessellating provides the tessellated curve to the second means for tessellating,
wherein the second means for tessellating further comprises:
means for receiving at least one input, and
means for generating at least one coordinate of at least one vertex point corresponding to one of the second line segments based on the at least one input.

28. The device of claim 27, further comprising:
means for transforming the curve from a first coordinate space to a second coordinate space, wherein the second tessellating means tessellates the portion of the tessellated curve represented by the one of the first line segments into the second line segments based on a scale factor used in transforming the tessellated curve.

29. The device of claim 28, wherein the second tessellating means tessellates the portion of the tessellated curve represented by the one of the first line segments into a larger number of second line segments when the scale factor increases.

30. The device of claim 27, further comprising means for dynamically balancing an amount of tessellation of the tessellated curve performed by the first tessellating means based on at least a load of the first tessellating means.

31. The device of claim 20, wherein the first tessellating means tessellates the curve to divide the curve into a smaller number of first line segments when the load of the first tessellating means exceeds a threshold.

32. The device of claim 27, wherein the second tessellating means tessellates a first portion of the tessellated curve represented by a first of the first line segments and a second portion of the tessellated curve represented by a second of the first line segments in parallel.

33. The device of claim 27, wherein the second tessellating means receives a plurality of vertex attributes, the plurality of vertex attributes including at least two vertex attributes that specify vertex points of the one of the first line segments and generates additional vertex attributes that represent additional points that lie on the portion of the tessellated curve represented by the one of the first line segments to tessellate the portion of the tessellated curve into the second line segments.

34. The device of claim 27, wherein the generating means comprise a pipeline of a plurality of multiply and accumulation operation units that implement a polynomial representation of the tessellated curve to generate at least one coordinate of the at least one vertex point corresponding to the one of the second line segments based on the at least one input.

35. The device of claim 34, further comprising means for configuring the pipeline of the plurality of multiply and accumulation operation units such that the tessellation hardware operates as two or more parallel pipelines that each generate a coordinate of a vertex point.

36. The device of claim 27, wherein the first tessellating means is a first component of a graphics processing unit (GPU) and the second tessellating means is a second component of the GPU.

37. The device of claim 27, further comprising means for rendering the second line segments to present the tessellated curve to a display.

38. The device of claim 27, further comprising third means for tessellating a portion of the tessellated curve represented by one of the second line segments into third line segments.

39. The device of claim 27, wherein one of the first tessellating means and the second tessellating means tessellate a portion of the tessellated curve represented by one of the second line segments into third line segments.

40. A computer-readable storage medium having stored thereon instructions that, when executed, cause one or more processors to:
tessellate a curve to divide the curve into first line segments with a first computing unit;
receive, with a second computing unit comprising dedicated tessellation hardware, a portion of the tessellated curve represented by one of the first line segments, wherein the first computing unit provides the tessellated curve to the second computing unit; and
tessellate further the portion of the tessellated curve represented by the one of the first line segments into second line segments with the second computing unit,
wherein to tessellate further the portion of the tessellated curve represented by the one of the first line segments into second line segments with the second computing unit, the second computing unit is further configured to:
receive at least one input; and
generate at least one coordinate of at least one vertex point corresponding to one of the second line segments based on the at least one input.

* * * * *